United States Patent
Richter

(10) Patent No.: US 11,748,953 B2
(45) Date of Patent: Sep. 5, 2023

(54) METHOD AND DEVICES FOR SWITCHING BETWEEN VIEWING VECTORS IN A SYNTHESIZED REALITY SETTING

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/057,173

(22) PCT Filed: May 28, 2019

(86) PCT No.: PCT/US2019/034142
§ 371 (c)(1),
(2) Date: Nov. 20, 2020

(87) PCT Pub. No.: WO2019/231893
PCT Pub. Date: Dec. 5, 2019

(65) Prior Publication Data
US 2021/0272367 A1  Sep. 2, 2021

Related U.S. Application Data

(60) Provisional application No. 62/816,779, filed on Mar. 11, 2019, provisional application No. 62/679,201, filed on Jun. 1, 2018.

(51) Int. Cl.
*G06T 19/00*  (2011.01)
*G06T 15/00*  (2011.01)
*G06T 15/20*  (2011.01)

(52) U.S. Cl.
CPC .......... *G06T 19/006* (2013.01); *G06T 15/005* (2013.01); *G06T 15/20* (2013.01)

(58) Field of Classification Search
None
See application file for complete search history.

(56) References Cited

U.S. PATENT DOCUMENTS

| 6,522,347 | B1* | 2/2003 | Tsuji | G06Q 30/02 345/419 |
| 11,418,848 | B2* | 8/2022 | Wang | G06F 3/012 |
| 2002/0053089 | A1* | 5/2002 | Massey | H04N 21/812 725/38 |

(Continued)

FOREIGN PATENT DOCUMENTS

WO  2018/005596 A1  1/2018

OTHER PUBLICATIONS

Tubik, "UX Design Glossary: How to Use Affordances in User Interfaces", May 2018, retrieved from "https://uxplanet.org/ux-design-glossary-how-to-use-affordances-in-user-interfaces-393c8e9686e4", Accessed Sep. 25, 2021 (Year: 2018).*

(Continued)

*Primary Examiner* — Michael J Cobb
(74) *Attorney, Agent, or Firm* — Fernando & Partners, LLP

(57) ABSTRACT

In some implementations, a method includes: presenting a synthesized reality (SR) setting associated with predetermined content from a first viewing vector at a first time; presenting a navigation timeline for the predetermined content including a plurality of viewing vector affordances at respective times on the navigation timeline, wherein each viewing vector characterizes how the SR content is displayed at the respective times; detecting an input selecting a respective viewing vector affordance on the navigation timeline associated with a second time within the predetermined content; and, in response to detecting the input selecting the respective viewing vector affordance on the navigation timeline, updating the SR setting in order to present the SR setting from a second viewing vector different from the first viewing vector, wherein the second viewing vector characterizes display of the predetermined content at the second times.

25 Claims, 23 Drawing Sheets

(56) References Cited

U.S. PATENT DOCUMENTS

| | | | | |
|---|---|---|---|---|
| 2005/0030309 | A1* | 2/2005 | Gettman | G06F 16/954 345/419 |
| 2015/0209664 | A1* | 7/2015 | Haseltine | G06F 3/011 463/31 |
| 2015/0375103 | A1 | 12/2015 | George | |
| 2016/0299641 | A1* | 10/2016 | Lebeau | G06F 3/04883 |
| 2016/0350973 | A1* | 12/2016 | Shapira | G06F 3/017 |
| 2017/0032570 | A1* | 2/2017 | Bear | H04N 7/157 |
| 2018/0004481 | A1* | 1/2018 | Fallon | G06F 3/167 |
| 2018/0376170 | A1* | 12/2018 | Lin | G06Q 10/101 |
| 2019/0176027 | A1* | 6/2019 | Smith | G06T 7/60 |
| 2019/0243530 | A1* | 8/2019 | De Ridder | G06F 3/04817 |
| 2020/0174563 | A1* | 6/2020 | Peters | G06F 3/012 |
| 2020/0197825 | A1* | 6/2020 | Bear | H04N 23/66 |
| 2021/0311543 | A1* | 10/2021 | Chundi | G06F 3/016 |
| 2022/0067993 | A1* | 3/2022 | Li | G06Q 30/0601 |

OTHER PUBLICATIONS

Wikipedia, "Night Trap", 1992, retrieved from "https://en.wikipedia.org/wiki/Night_Trap" (Year: 1992).*

Moby Gambes "Voyer (CD-I)", 1993, retrieved from "https://www.mobygames.com/game/cd-i/voyeur" (Year: 1993).*

Academic, "Voyer (Video Game)", 1993, retrieved from "https://en-academic.com/dic.nsf/enwiki/923413" (Year: 1993).*

Jessica Conditt, "Press A to change your life: 'Otis' the new American Cinema", 2017, retrieved from "https://www.engadget.com/amp/2017/09/08/otis-film-video-game-interactive-murder-drama-rust-belt-trump/" (Year: 2017).*

Peter Weyhrauch, "Guidling Interactive Drama", 1997, Dissertation, Carnegie Mellon University, Pittsburgh, PA CMU-CS-97-109 (Year: 1997).*

Mark O. Riedl, Vadim Bulitko, "Interactive Narrative: An Intelligent Systems Approach", 2013, Association for the Advancement of Artificial Intelligence Spring 2013, pp. 67-77 (Year: 2013).*

Paul Nelson, "Interactive Storytelling: Designing Branching Narrative", 2015 retrieved from "https://thestoryelement.wordpress.com/category/interactive-storytelling/" (Year: 2015).*

PCT International Search Report and Written Opinion dated Sep. 13, 2019, International Application No. PCT/US2019/034142, pp. 1-11.

International Search Report and Written Opinion dated May 22, 2019, International Application No. PCT/US2019/018303, pp. 1-11.

Robin Baumgarten et al., "Combining AI Methods for Learning Bots in a Real-Time Strategy Game", International Journal of Computer Games Technology, vol. 2009, Article ID 129075, pp. 1-10.

* cited by examiner

METHOD AND DEVICES FOR SWITCHING BETWEEN VIEWING VECTORS IN A SYNTHESIZED REALITY SETTING

TECHNICAL FIELD

The present disclosure generally relates to presenting synthesized reality (SR) settings and, more specially, to switching between viewing vectors in an SR setting.

BACKGROUND

Some devices are capable of generating and presenting synthesized reality settings. Some synthesized reality settings include virtual settings that are simulated replacements of physical settings. Some synthesized reality settings include augmented settings that are modified versions of physical settings. Some devices that present synthesized reality settings include mobile communication devices such as smartphones, head-mountable displays (HMDs), eyeglasses, heads-up displays (HUDs), head-mountable enclosures, and optical projection systems. Most previously available devices that present synthesized reality setting are ineffective at presenting representations of certain objects. For example, some previously available devices that present synthesized reality settings are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
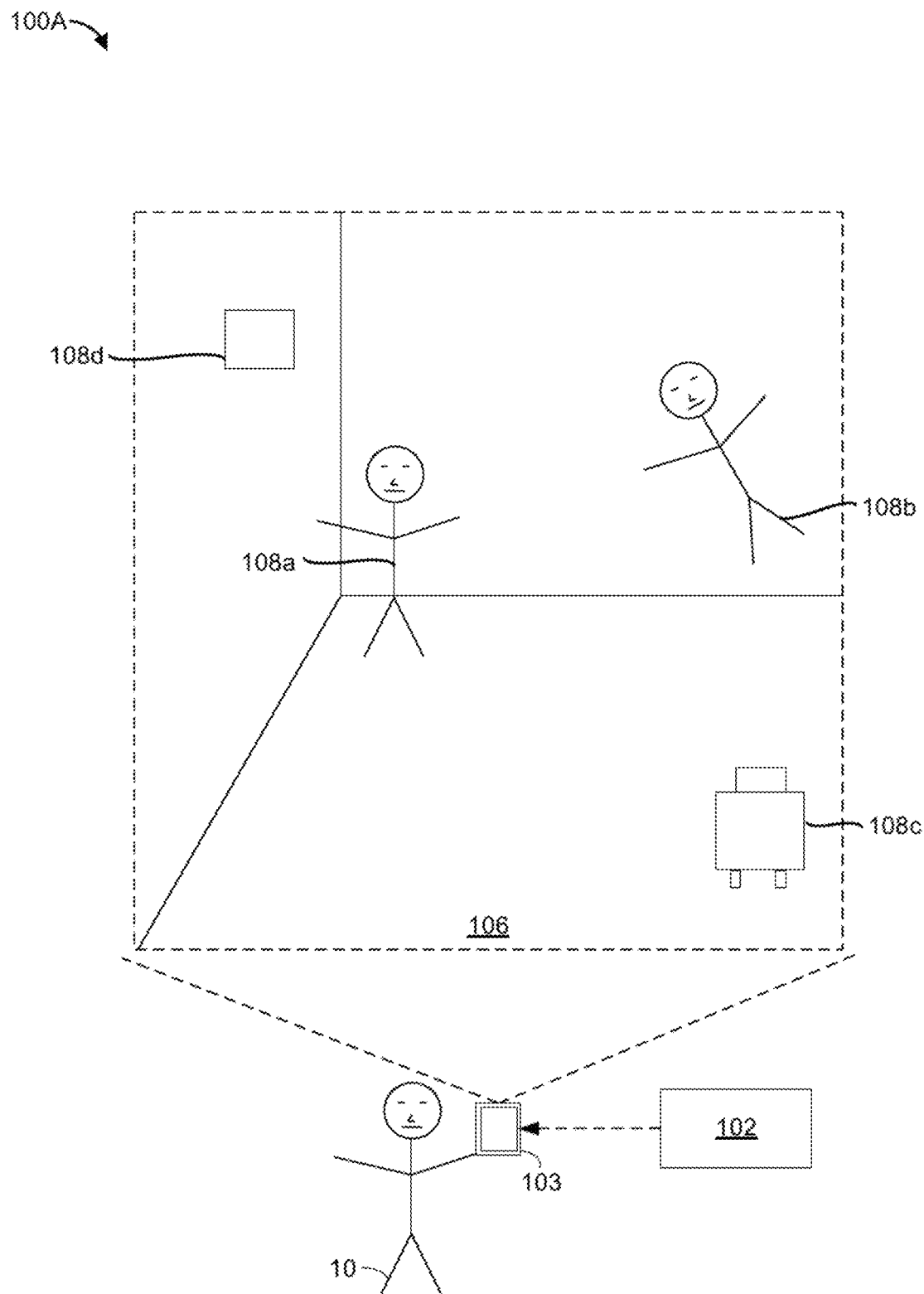
FIGS. 1A and 1B are diagrams of example operating environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for changing viewing vectors within a synthesized reality (SR) setting. In various implementations, a device includes a non-transitory memory and one or more processors coupled with the non-transitory memory. In some implementations, a method includes: presenting an SR setting associated with predetermined content from a first viewing vector at a first time, wherein the first viewing vector characterizes display of the predetermined content at the first time; presenting a navigation timeline for the predetermined content including a current time indicator positioned at the first time and a plurality of viewing vector affordances each associated with a different viewing vector at respective times on the navigation timeline, wherein each viewing vector characterizes how the SR content is displayed at the respective times; detecting an input selecting a respective viewing vector affordance on the navigation timeline associated with a second time within the predetermined content; and, in response to detecting the input selecting the respective viewing vector affordance on the navigation timeline, updating the SR setting in order to present the SR setting from a second viewing vector different from the first viewing vector, wherein the second viewing vector characterizes display of the predetermined content at the second time.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, an SR system may detect an individual walking a few paces forward and, responsive thereto, adjust graphics and audio presented to the individual in a manner similar to how such scenery and sounds would change in a physical setting. Modifications to attribute(s) of virtual object(s) in an SR setting also may be made responsive to representations of movement (e.g., audio instructions).

An individual may interact with and/or sense an SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). An MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

While experiencing a synthesized reality (SR) setting including predetermined content spanning a duration of time (e.g., for a narrative or story arc, a movie, historical event, fictional story, etc.), a user is able to move within the SR setting and select different perspectives of the predetermined content (e.g., an omniscient point-of-view (POV), a general's POV, infantry unit POV, individual soldier's POV, or the like within a historical battle) from which to experience portions of the predetermined content. However, if a user elects to temporally jump between disparate and discontinuous portions of the predetermined content, the SR characteristics characterizing a viewing vector (e.g., field-of-view (FOV), pose/rotational coordinates, translational coordinates in SR, perspective, and/or the like) associated with the first time may be poorly matched to the predetermined content at a second time.

As such, in various implementations, while presenting the SR setting using a first viewing vector, a navigation timeline is displayed (e.g., overlaid on the SR setting, presented as a part of a separate controls interface, or the like) for the predetermined content with a plurality of viewing vector affordances at a corresponding plurality of times on the navigation timeline, wherein each viewing vector is characterized by a FOV, a pose, a set of SR coordinates, a perspective, and/or the like. In some implementations, the viewing vectors associated with the plurality of viewing vector affordances are pre-selected by a director, historian, or the like. In some implementations, the viewing vectors associated with the plurality of viewing vector affordances are selected based on one or more filters determined based on the user (e.g., viewing vectors associated with machinery for a mechanic filter, viewing vectors associated with naval exercises for a naval trainee, viewing vectors associated with weather for a meteorologist, etc.).

FIG. 1A is a block diagram of an example operating environment 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100A includes a controller 102 and an electronic device 103. In the example of FIG. 1A, the electronic device 103 is being held by a user 10. In some implementations, the electronic device 103 includes a smartphone, a tablet, a laptop, or the like.

As illustrated in FIG. 1A, the electronic device 103 presents a synthesized reality setting 106. In some implementations, the synthesized reality setting 106 is generated by the controller 102 and/or the electronic device 103. In some implementations, the synthesized reality setting 106 includes a virtual setting that is a simulated replacement of a physical setting. In other words, in some implementations, the synthesized reality setting 106 is simulated by the controller 102 and/or the electronic device 103. In such implementations, the synthesized reality setting 106 is different from the physical setting where the electronic device 103 is located. In some implementations, the synthesized reality setting 106 includes an augmented setting that is a modified version of a physical setting. For example, in some implementations, the controller 102 and/or the electronic device 103 modify (e.g., augment) the physical setting where the electronic device 103 is located in order to generate the synthesized reality setting 106. In some implementations, the controller 102 and/or the electronic device 103 generate the synthesized reality setting 106 by simulating a replica of the physical setting where the electronic device 103 is located. In some implementations, the controller 102 and/or the electronic device 103 generate the synthesized reality setting 106 by removing and/or adding items from the simulated replica of the physical setting where the electronic device 103 is located.

In some implementations, the synthesized reality setting 106 includes various SR representations of objective-effectuators, such as a boy action figure representation 108a, a girl action figure representation 108b, a robot representation 108c, and a drone representation 108d. In some implementations, the objective-effectuators represent characters from fictional materials, such as movies, video games, comics, and novels. For example, the boy action figure representation 108a represents a 'boy action figure' character from a fictional comic, and the girl action figure representation 108b represents a 'girl action figure' character from a fictional video game. In some implementations, the synthesized reality setting 106 includes objective-effectuators that represent characters from different fictional materials (e.g., from different movies/games/comics/novels). In various implementations, the objective-effectuators represent things (e.g., tangible objects). For example, in some implementations, the objective-effectuators represent equipment (e.g., machinery such as planes, tanks, robots, cars, etc.). In the example of FIG. 1A, the robot representation 108c represents a robot and the drone representation 108d represents a drone. In some implementations, the objective-effectuators represent things (e.g., equipment) from fictional materials. In some implementations, the objective-effectuators represent things from a physical setting, including things located inside and/or outside of the synthesized reality setting 106.

In various implementations, the objective-effectuators perform one or more actions in order to effectuate (e.g., complete/satisfy/achieve) one or more objectives. In some implementations, the objective-effectuators perform a sequence of actions. In some implementations, the controller 102 and/or the electronic device 103 determine the actions that the objective-effectuators are to perform. In some implementations, the actions of the objective-effectuators are within a degree of similarity to actions that the corresponding characters/things perform in the fictional material. In the example of FIG. 1A, the girl action figure representation 108b is performing the action of flying (e.g., because the corresponding 'girl action figure' character is capable of flying, and/or the 'girl action figure' character frequently flies in the fictional materials). In the example of FIG. 1A, the drone representation 108d is performing the action of hovering (e.g., because drones in physical settings are capable of hovering). In some implementations, the controller 102 and/or the electronic device 103 obtain the actions for the objective-effectuators. For example, in some implementations, the controller 102 and/or the electronic device 103 receive the actions for the objective-effectuators from a remote server that determines (e.g., selects) the actions.

In various implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, SR representations of the objective-effectuators are referred to as object representations, for example, because the SR representations of the objective-effectuators represent various objects (e.g., real objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective-effectuator representing an environment is referred to as an environmental objective-effectuator. In some implementations, an environmental objective-effectuator performs environmental actions to effectuate an environmental objective.

In some implementations, the synthesized reality setting 106 is generated based on an input from the user 10. For example, in some implementations, the electronic device 103 receives an input indicating a terrain for the synthesized reality setting 106. In such implementations, the controller 102 and/or the electronic device 103 configure the synthesized reality setting 106 such that the synthesized reality setting 106 includes the terrain indicated via the input. In some implementations, the input indicates environmental conditions for the synthesized reality setting 106. In such implementations, the controller 102 and/or the electronic device 103 configure the synthesized reality setting 106 to have the environmental conditions indicated by the input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow).

In some implementations, the actions for the objective-effectuators are determined (e.g., generated) based on an input from the user 10. For example, in some implementations, the electronic device 103 receives an input indicating placement of the SR representations of the objective-effectuators. In such implementations, the controller 102 and/or the electronic device 103 position the SR representations of the objective-effectuators in accordance with the placement indicated by the input. In some implementations, the input indicates specific actions that the objective-effectuators are permitted to perform. In such implementations, the controller 102 and/or the electronic device 103 select the actions for the objective-effectuator from the specific actions indicated by the input. In some implementations, the controller 102 and/or the electronic device 103 forgo actions that are not among the specific actions indicated by the input. In some implementations, the controller 102 and/or the electronic device 103 include at least a portion of the emergent content architectures in FIGS. 8A-8C.

Figure 1B:
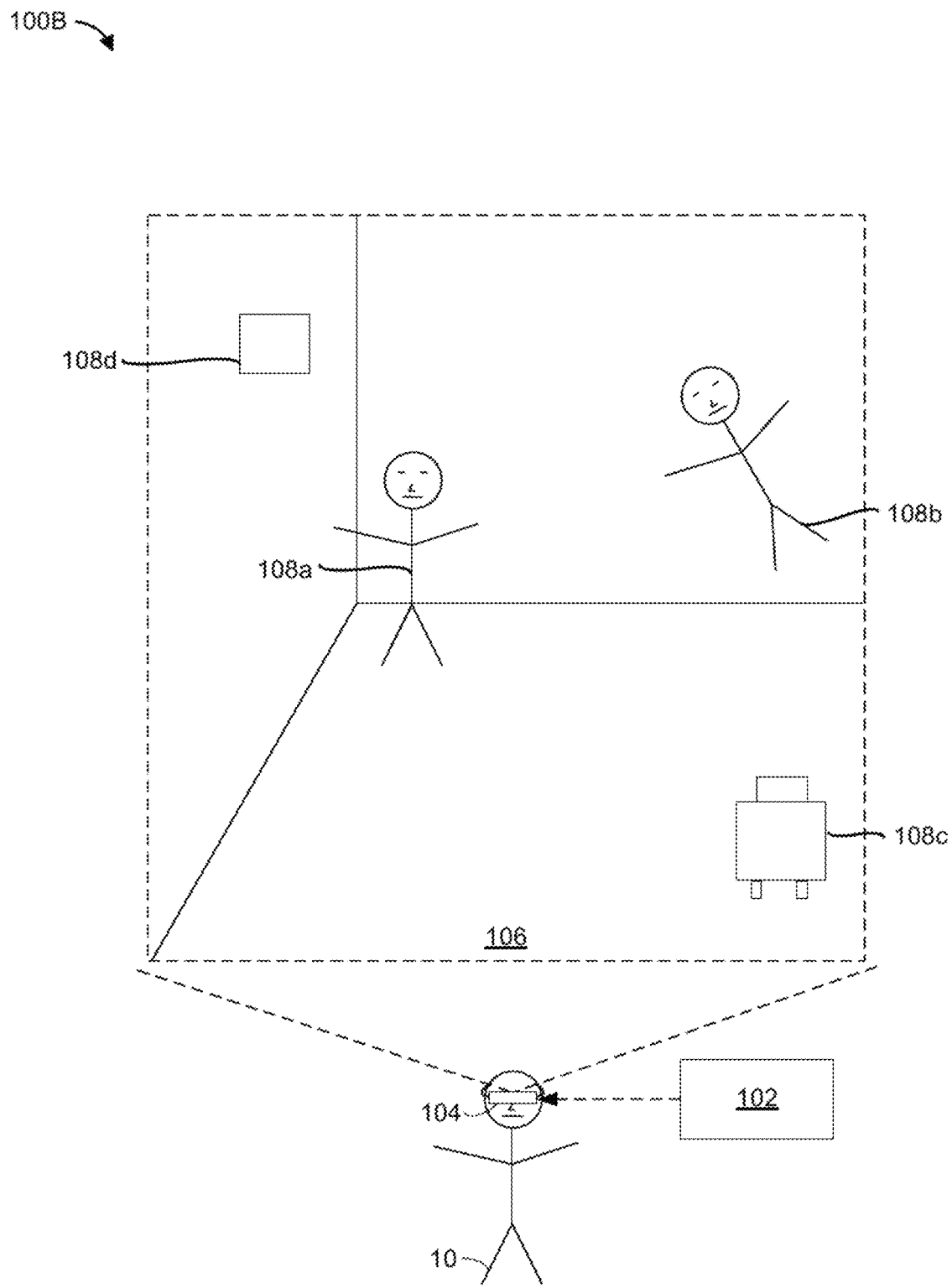

FIG. 1B is a block diagram of an example operating environment 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100B includes the controller 102 and a head-mountable device (HMD) 104. In the example of FIG. 1B, the HMD 104 is worn by the user 10. In various implementations, the HMD 104 operates in substantially the same manner as the electronic device 103 shown in FIG. 1A. In some implementations, the HMD 104 performs substantially the same operations as the electronic device 103 shown in FIG. 1A. In some implementations, the HMD 104 includes a head-mountable enclosure. In some implementations, the head-mountable enclosure is shaped to form a receptacle for receiving an electronic device with a display (e.g., the electronic device 103 shown in FIG. 1A). For example, in some implementations, the electronic device 103 shown in FIG. 1A can be slid into the HMD 104. In some implementations, the HMD 104 includes an integrated display for presenting a synthesized reality experience to the user 10. In some implementations, the controller 102 and/or the HMD 104 include at least a portion of the emergent content architectures in FIGS. 8A-8C.

Figure 2:
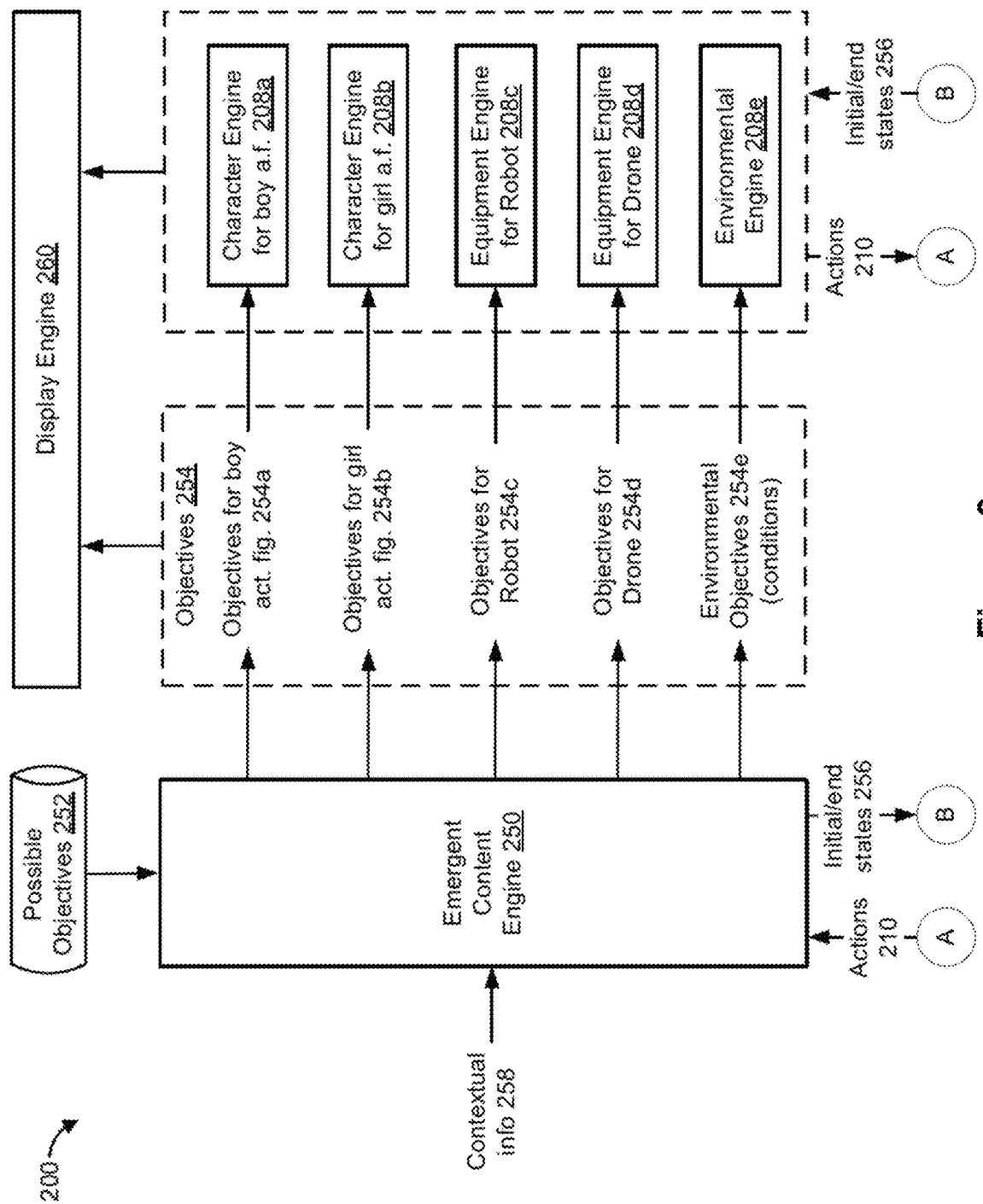
FIG. 2 is a block diagram of an example system in accordance with some implementations.

FIG. 2 is a block diagram of an example system 200 that generates objectives for various objective-effectuators in an SR setting. For example, the system 200 generates objectives for the boy action figure representation 108a, the girl action figure representation 108b, the robot representation 108c, and/or the drone representation 108d shown in FIGS. 1A and 1B. In the example of FIG. 2, the system 200 includes a boy action figure character engine 208a, a girl action figure character engine 208b, a robot equipment engine 208c, and a drone equipment engine 208d that generate actions 210 for the boy action figure representation 108a, the girl action figure representation 108b, the robot representation 108c, and the drone representation 108d, respectively. In some implementations, the system 200 also includes an environmental engine 208e, an emergent content engine 250, and a display engine 260.

In various implementations, the emergent content engine 250 generates respective objectives 254 for objective-effectuators that are in the SR setting and/or for the environment of the SR setting. In the example of FIG. 2, the emergent content engine 250 generates boy action figure objectives 254a for the boy action figure representation 108a, girl action figure objectives 254b for the girl action figure representation 108b, robot objectives 254c for the robot representation 208c, drone objectives 254d for the drone representation 108d, and/or environmental objectives 254e (e.g., environmental conditions) for the environment of the SR setting 106. As illustrated in FIG. 2, the emergent content engine 250 provides the objectives 254 to corresponding character/equipment/environmental engines. In the example of FIG. 2, the emergent content engine 250 provides the boy action figure objectives 254a to the boy action figure character engine 208a, the girl action figure objectives 254b to the girl action figure character engine 208b, the robot objectives 254c to the robot equipment engine 208c, the drone objectives 254d to the drone equipment engine 208d, and the environmental objectives 254e to the environmental engine 208e.

In various implementations, the emergent content engine 250 generates the objectives 254 based on a function of possible objectives 252 (e.g., a set of predefined objectives), contextual information 258 characterizing the SR setting, and actions 210 provided by the character/equipment/environmental engines. For example, in some implementations, the emergent content engine 250 generates the objectives 254 by selecting the objectives 254 from the possible objectives 252 based on the contextual information 258 and/or the actions 210. In some implementations, the possible objectives 252 are stored in a datastore. In some implementations, the possible objectives 252 are obtained from corresponding fictional source material (e.g., by scraping video games, movies, novels, and/or comics). For example, in some implementations, the possible objectives 252 for the girl action figure representation 108b include saving lives, rescuing pets, fighting crime, etc.

In some implementations, the emergent content engine 250 generates the objectives 254 based on the actions 210 provided by the character/equipment/environmental engines. In some implementations, the emergent content engine 250 generates the objectives 254 such that, given the actions 210, a probability of completing the objectives 254 satisfies a threshold (e.g., the probability is greater than the threshold, for example, the probability is greater than 80%). In some implementations, the emergent content engine 250 generates objectives 254 that have a high likelihood of being completed with the actions 210.

In some implementations, the emergent content engine 250 ranks the possible objectives 252 based on the actions 210. In some implementations, a rank for a particular possible objective 252 indicates the likelihood of completing that particular possible objective 252 given the actions 210. In such implementations, the emergent content engine 250 generates the objective 254 by selecting the highest N ranking possible objectives 252, where N is a predefined integer (e.g., 1, 3, 5, 10, etc.).

In some implementations, the emergent content engine 250 establishes initial/end states 256 for the SR setting based on the objectives 254. In some implementations, the initial/end states 256 indicate placements (e.g., locations) of various character/equipment representations within the SR setting. In some implementations, the SR setting is associated with a time duration (e.g., a few seconds, minutes, hours, or days). For example, the SR setting is scheduled to last for the time duration. In such implementations, the initial/end states 256 indicate placements of various character/equipment representations at/towards the beginning and/or at/towards the end of the time duration. In some implementations, the initial/end states 256 indicate environmental conditions for the SR setting at/towards the beginning/end of the time duration associated with the SR setting.

In some implementations, the emergent content engine 250 provides the objectives 254 to the display engine 260 in addition to the character/equipment/environmental engines. In some implementations, the display engine 260 determines whether the actions 210 provided by the character/equipment/environmental engines are consistent with the objectives 254 provided by the emergent content engine 250. For example, the display engine 260 determines whether the actions 210 satisfy objectives 254. In other words, in some implementations, the display engine 260 determines whether the actions 210 improve the likelihood of completing/achieving the objectives 254. In some implementations, if the actions 210 satisfy the objectives 254, then the display engine 260 modifies the SR setting in accordance with the actions 210. In some implementations, if the actions 210 do not satisfy the objectives 254, then the display engine 260 forgoes modifying the SR setting in accordance with the actions 210.

Figure 3A:
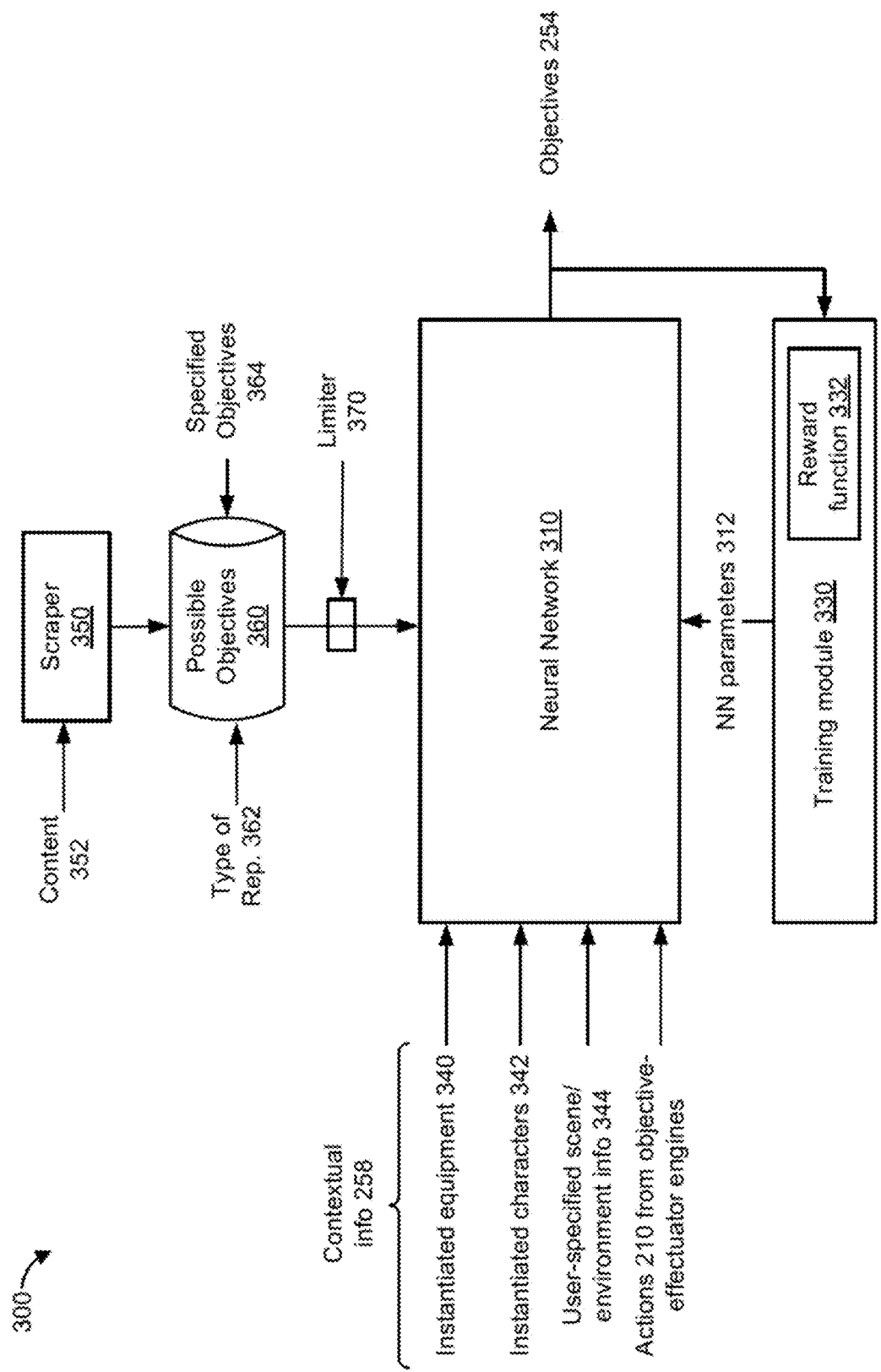
FIG. 3A is a block diagram of an example objective-effectuator engine in accordance with some implementations.

FIG. 3A is a block diagram of an example emergent content engine 300 in accordance with some implementations. In some implementations, the emergent content engine 300 implements the emergent content engine 250 shown in FIG. 2. In various implementations, the emergent content engine 300 generates the objectives 254 for various objective-effectuators that are instantiated in an SR setting (e.g., character/equipment representations such as the boy action figure representation 108a, the girl action figure representation 108b, the robot representation 108c, and/or the drone representation 108d shown in FIGS. 1A and 1B). In some implementations, at least some of the objectives 254 are for an environmental engine (e.g., the environmental engine 208e shown in FIG. 2) that affects an environment of the SR setting.

In various implementations, the emergent content engine 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible objectives 360 to the neural network 310. In various implementations, the neural network 310 generates the objectives 254 (e.g., the objectives 254a for the boy action figure representation 108a, the objectives 254b for the girl action figure representation 108b, the objectives 254c for the robot representation 108c, the objectives 254d for the drone representation 108d, and/or the environmental objectives 254e shown in FIG. 2).

In some implementations, the neural network 310 includes a long short-term memory (LSTM) recurrent neural network (RNN). In various implementations, the neural network 310 generates the objectives 254 based on a function of the possible objectives 360. For example, in some implementations, the neural network 310 generates the objectives 254 by selecting a portion of the possible objectives 360. In some implementations, the neural network 310 generates the objectives 254 such that the objectives 254 are within a degree of similarity to the possible objectives 360.

In various implementations, the neural network 310 generates the objectives 254 based on the contextual information 258 characterizing the SR setting. As illustrated in FIG. 3A, in some implementations, the contextual information 258 indicates instantiated equipment representations 340, instantiated character representations 342, user-specified scene/environment information 344, and/or actions 210 from objective-effectuator engines.

In some implementations, the neural network 310 generates the objectives 254 based on the instantiated equipment representations 340. In some implementations, the instantiated equipment representations 340 refer to equipment representations that are located in the SR setting. For example, referring to FIGS. 1A and 1B, the instantiated equipment representations 340 include the robot representation 108c and the drone representation 108d in the SR setting 106. In some implementations, the objectives 254 include interacting with one or more of the instantiated equipment representations 340. For example, referring to FIGS. 1A and 1B, in some implementations, one of the objectives 254a for the boy action figure representation 108a includes destroying the robot representation 108c, and one of the objectives 254b for the girl action figure representation 108b includes protecting the robot representation 108c.

In some implementations, the neural network 310 generates the objectives 254 for each character representation based on the instantiated equipment representations 340. For example, referring to FIGS. 1A and 1B, if the SR setting 106 includes the robot representation 108c, then one of the objectives 254a for the boy action figure representation 108a includes destroying the robot representation 108c. However, if the SR setting 106 does not include the robot representation 108c, then the objective 254a for the boy action figure representation 108a includes maintaining peace within the SR setting 106.

In some implementations, the neural network 310 generates objectives 254 for each equipment representation based on the other equipment representations that are instantiated in the SR setting. For example, referring to FIGS. 1A and 1B, if the SR setting 106 includes the robot representation 108c, then one of the objectives 254d for the drone representation 108d includes protecting the robot representation 108c. However, if the SR setting 106 does not include the robot representation 108c, then the objective 254d for the drone representation 108d includes hovering at the center of the SR setting 106.

In some implementations, the neural network 310 generates the objectives 254 based on the instantiated character representations 342. In some implementations, the instantiated character representations 342 refer to character representations that are located in the SR setting. For example, referring to FIGS. 1A and 1B, the instantiated character representations 342 include the boy action figure representation 108a and the girl action figure representation 108b in the SR setting 106. In some implementations, the objectives 254 include interacting with one or more of the instantiated character representations 342. For example, referring to FIGS. 1A and 1B, in some implementations, one of the objectives 254d for the drone representation 108d includes following the girl action figure representation 108b. Similarly, in some implementations, one of the objectives 254c for the robot representation 108c include avoiding the boy action figure representation 108a.

In some implementations, the neural network 310 generates the objectives 254 for each character representation based on the other character representations that are instantiated in the SR setting. For example, referring to FIGS. 1A and 1B, if the SR setting 106 includes the boy action figure representation 108a, then one of the objectives 254b for the girl action figure representation 108b includes catching the boy action figure representation 108a. However, if the SR setting 106 does not include the boy action figure representation 108a, then the objective 254b for the girl action figure representation 108b includes flying around the SR setting 106.

In some implementations, the neural network 310 generates objectives 254 for each equipment representation based on the character representations that are instantiated in the SR setting. For example, referring to FIGS. 1A and 1B, if the SR setting 106 includes the girl action figure representation 108b, then one of the objectives 254d for the drone representation 108d includes following the girl action figure representation 108b. However, if the SR setting 106 does not include the girl action figure representation 108b, then the objective 254d for the drone representation 108d includes hovering at the center of the SR setting 106.

In some implementations, the neural network 310 generates the objectives 254 based on the user-specified scene/environment information 344. In some implementations, the user-specified scene/environment information 344 indicates boundaries of the SR setting. In such implementations, the neural network 310 generates the objectives 254 such that the objectives 254 can be satisfied (e.g., achieved) within the boundaries of the SR setting. In some implementations, the neural network 310 generates the objectives 254 by selecting a portion of the possible objectives 252 that are better suited for the environment indicated by the user-specified scene/environment information 344. For example, the neural network 310 sets one of the objectives 254d for the drone representation 108d to hover over the boy action figure representation 108a when the user-specified scene/environment information 344 indicates that the skies within the SR setting are clear. In some implementations, the neural network 310 forgoes selecting a portion of the possible objectives 252 that are not suitable for the environment indicated by the user-specified scene/environment information 344. For example, the neural network 310 forgoes the hovering objective for the drone representation 108d when the user-specified scene/environment information 344 indicates high winds within the SR setting.

In some implementations, the neural network 310 generates the objectives 254 based on the actions 210 provided by various objective-effectuator engines. In some implementations, the neural network 310 generates the objectives 254 such that the objectives 254 can be satisfied (e.g., achieved) given the actions 210 provided by the objective-effectuator engines. In some implementations, the neural network 310 evaluates the possible objectives 360 with respect to the actions 210. In such implementations, the neural network 310 generates the objectives 360 by selecting the possible objectives 360 that can be satisfied by the actions 210 and forgoing selecting the possible objectives 360 that cannot be satisfied by the actions 210.

In various implementations, the training module 330 trains the neural network 310. In some implementations, the training module 330 provides neural network (NN) parameters 312 to the neural network 310. In some implementations, the neural network 310 includes model(s) of neurons, and the neural network parameters 312 represent weights for the model(s). In some implementations, the training module 330 generates (e.g., initializes or initiates) the neural network parameters 312, and refines (e.g., adjusts) the neural network parameters 312 based on the objectives 254 generated by the neural network 310.

In some implementations, the training module 330 includes a reward function 332 that utilizes reinforcement learning to train the neural network 310. In some implementations, the reward function 332 assigns a positive reward to objectives 254 that are desirable, and a negative reward to objectives 254 that are undesirable. In some implementations, during a training phase, the training module 330 compares the objectives 254 with verification data that includes verified objectives. In such implementations, if the objectives 254 are within a degree of similarity to the verified objectives, then the training module 330 stops training the neural network 310. However, if the objectives 254 are not within the degree of similarity to the verified objectives, then the training module 330 continues to train the neural network 310. In various implementations, the training module 330 updates the neural network parameters 312 during/after the training.

In various implementations, the scraper 350 scrapes content 352 to identify the possible objectives 360. In some implementations, the content 352 includes movies, video games, comics, novels, and fan-created content such as blogs and commentary. In some implementations, the scraper 350 utilizes various methods, systems and/or, devices associated with content scraping to scrape the content 352. For example, in some implementations, the scraper 350 utilizes one or more of text pattern matching, HTML (Hyper Text Markup Language) parsing, DOM (Document Object Model) parsing, image processing and audio analysis to scrape the content 352 and identify the possible objectives 360.

In some implementations, an objective-effectuator is associated with a type of representation 362, and the neural network 310 generates the objectives 254 based on the type of representation 362 associated with the objective-effectuator. In some implementations, the type of representation 362 indicates physical characteristics of the objective-effectuator (e.g., color, material type, texture, etc.). In such implementations, the neural network 310 generates the objectives 254 based on the physical characteristics of the objective-effectuator. In some implementations, the type of representation 362 indicates behavioral characteristics of the objective-effectuator (e.g., aggressiveness, friendliness, etc.). In such implementations, the neural network 310 generates the objectives 254 based on the behavioral characteristics of the objective-effectuator. For example, the neural network 310 generates an objective of being destructive for the boy action figure representation 108a in response to the behavioral characteristics including aggressiveness. In some implementations, the type of representation 362 indicates functional and/or performance characteristics of the objective-effectuator (e.g., strength, speed, flexibility, etc.). In such implementations, the neural network 310 generates the objectives 254 based on the functional characteristics of the objective-effectuator. For example, the neural network 310 generates an objective of always moving for the girl action figure representation 108b in response to the behavioral characteristics including speed. In some implementations, the type of representation 362 is determined based on a user input. In some implementations, the type of representation 362 is determined based on a combination of rules.

In some implementations, the neural network 310 generates the objectives 254 based on specified objectives 364. In some implementations, the specified objectives 364 are provided by an entity that controls (e.g., owns or created) the fictional material from where the character/equipment originated. For example, in some implementations, the specified objectives 364 are provided by a movie producer, a video game creator, a novelist, etc. In some implementations, the possible objectives 360 include the specified objectives 364. As such, in some implementations, the neural network 310 generates the objectives 254 by selecting a portion of the specified objectives 364.

In some implementations, the possible objectives 360 for an objective-effectuator are limited by a limiter 370. In some implementations, the limiter 370 restricts the neural network 310 from selecting a portion of the possible objectives 360. In some implementations, the limiter 370 is controlled by the entity that owns (e.g., controls) the fictional material from where the character/equipment originated. For example, in some implementations, the limiter 370 is controlled by a movie producer, a video game creator, a novelist, etc. In some implementations, the limiter 370 and the neural network 310 are controlled/operated by different entities. In some implementations, the limiter 370 restricts the neural network 310 from generating objectives that breach a criterion defined by the entity that controls the fictional material.

Figure 3B:
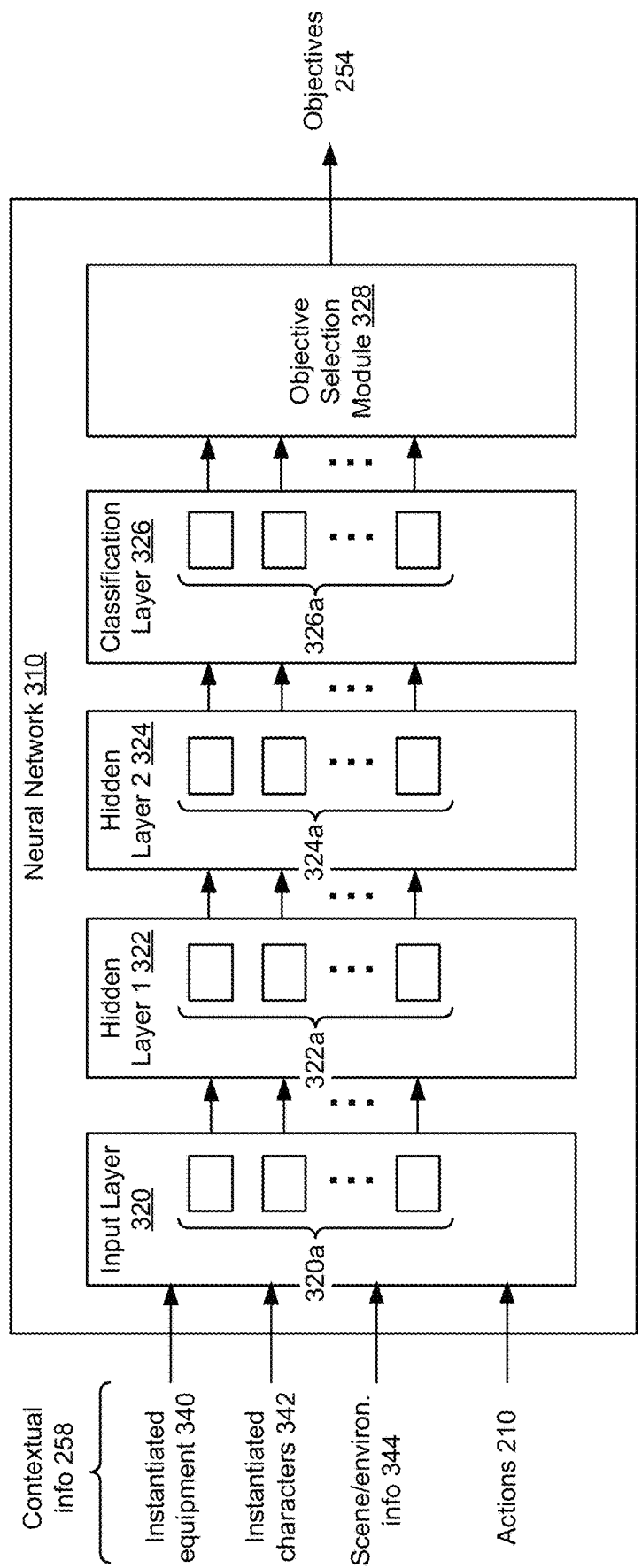
FIG. 3B is a block diagram of an example neural network in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and an objective selection module 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 receives various inputs. In some implementations, the input layer 320 receives the contextual information 258 as input. In the example of FIG. 3B, the input layer 320 receives inputs indicating the instantiated equipment 340, the instantiated characters 342, the user-specified scene/environment information 344, and the actions 210 from the objective-effectuator engines. In some implementations, the neural network 310 includes a feature extraction module (not shown) that generates a feature stream (e.g., a feature vector) based on the instantiated equipment 340, the instantiated characters 342, the user-specified scene/environment information 344, and/or the actions 210. In such implementations, the feature extraction module provides the feature stream to the input layer 320. As such, in some implementations, the input layer 320 receives a feature stream that is a function of the instantiated equipment 340, the instantiated characters 342, the user-specified scene/environment information 344, and the actions 210. In various implementations, the input layer 320 includes a number of LSTM logic elements 320a, which are also referred to as neurons or models of neurons by those of ordinary skill in the art. In some such implementations, an input matrix from the features to the LSTM logic elements 320a includes rectangular matrices. The size of this matrix is a function of the number of features included in the feature stream.

In some implementations, the first hidden layer 322 includes a number of LSTM logic elements 322a. As illustrated in the example of FIG. 3B, the first hidden layer 322 receives its inputs from the input layer 320.

In some implementations, the second hidden layer 324 includes a number of LSTM logic elements 324a. In some implementations, the number of LSTM logic elements 324a is the same as or similar to the number of LSTM logic elements 320a in the input layer 320 or the number of LSTM logic elements 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic elements 326a. In some implementations, the number of LSTM logic elements 326a is the same as or similar to the number of LSTM logic elements 320a in the input layer 320, the number of LSTM logic elements 322a in the first hidden layer 322 or the number of LSTM logic elements 324a in the second hidden layer 324. In some implementations, the classification layer 326 includes an implementation of a multinomial logistic function (e.g., a soft-max function) that produces a number of outputs that is approximately equal to the number of possible actions 360. In some implementations, each output includes a probability or a confidence measure of the corresponding objective being satisfied by the actions 210. In some implementations, the outputs do not include objectives that have been excluded by operation of the limiter 370.

In some implementations, the objective selection module 328 generates the objectives 254 by selecting the top N objective candidates provided by the classification layer 326. In some implementations, the top N objective candidates are likely to be satisfied by the actions 210. In some implementations, the objective selection module 328 provides the objectives 254 to a rendering and display pipeline (e.g., the display engine 260 shown in FIG. 2). In some implementations, the objective selection module 328 provides the objectives 254 to one or more objective-effectuator engines (e.g., the boy action figure character engine 208a, the girl action figure character engine 208b, the robot equipment engine 208c, the drone equipment engine 208d, and/or the environmental engine 208e shown in FIG. 2).

Figure 4:
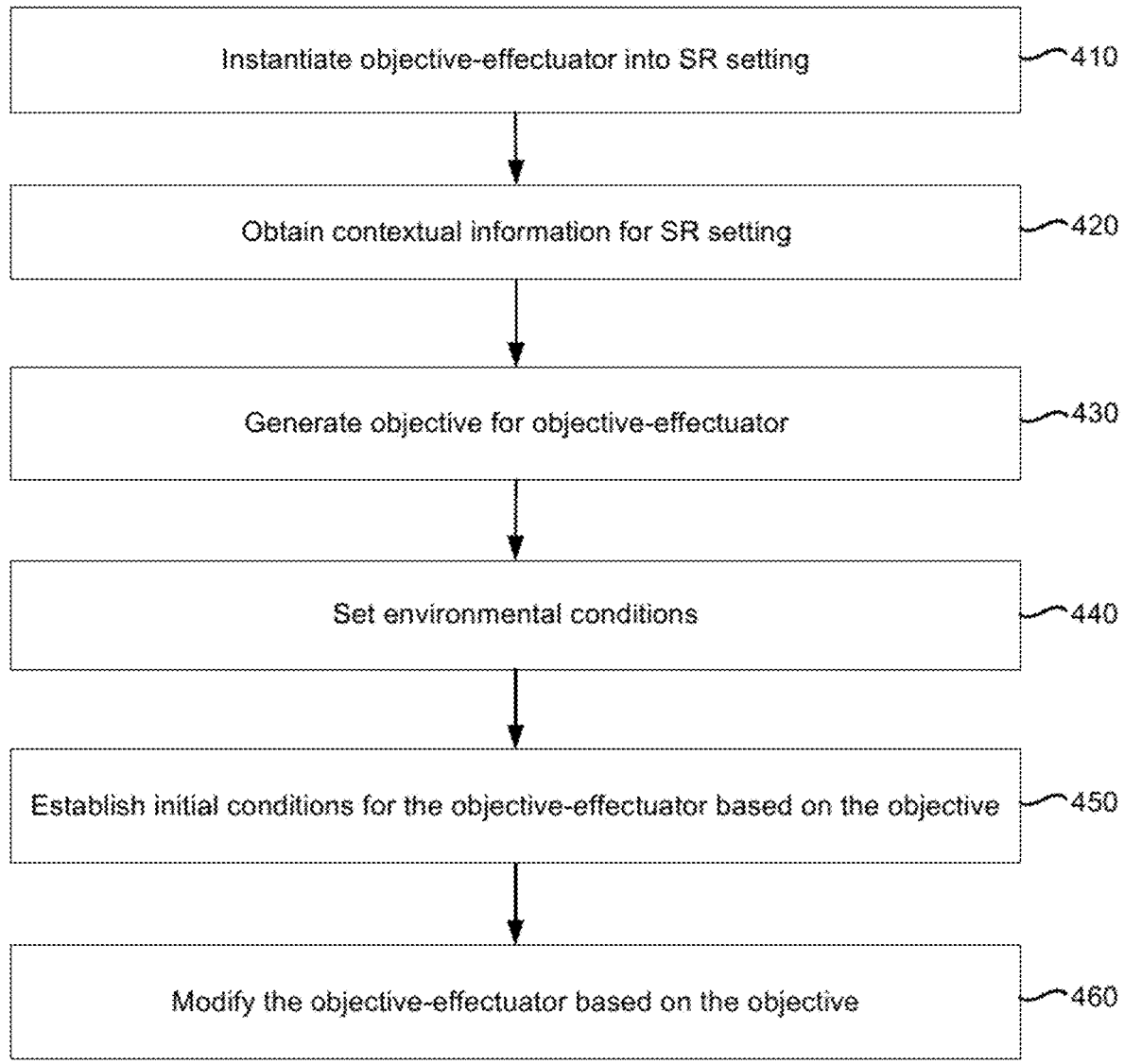
FIG. 4 is a flowchart representation of a method of presenting objective-effectuators in accordance with some implementations.

FIG. 4 is a flowchart representation of a method 400 of generating and presenting objective-effectuators in a synthesized reality (SR) setting. In various implementations, the method 400 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in some implementations, the method 400 includes instantiating an objective-effectuator into an SR setting, obtaining contextual information for the SR setting, generating an objective for the objective-effectuator, setting environmental conditions for the SR setting, establishing initial conditions for the objective-effectuator based on the objective, and modifying the objective-effectuator based on the objective.

As represented by block 410, in various implementations, the method 400 includes instantiating an objective-effectuator into an SR setting (e.g., instantiating the boy action figure representation 108a, the girl action figure representation 108b, the robot representation 108c, and/or the drone representation 108d into the SR setting 106 shown in FIGS. 1A and 1B). In some implementations, the objective-effectuator is characterized by a set of predefined objectives (e.g., the possible objectives 360 shown in FIG. 3A) and a set of visual rendering attributes.

As represented by block 420, in various implementations, the method 400 includes obtaining contextual information characterizing the SR setting (e.g., the contextual information 258 shown in FIGS. 2-3B). In some implementations, the method 400 includes receiving the contextual information (e.g., from a user).

As represented by block 430, in various implementations, the method 400 includes generating an objective for the objective-effectuator based on a function of the set of predefined objectives, the contextual information, and a set of predefined actions for the objective-effectuator. For example, referring to FIG. 2, the method 400 includes generating the objectives 254 based on the possible objectives 252, the contextual information 258, and the actions 210.

As represented by block 440, in various implementations, the method 400 includes setting environmental conditions for the SR setting based on the objective for the objective-effectuator. For example, referring to FIG. 2, the method 400 includes generating the environmental objectives 254e (e.g., the environmental conditions).

As represented by block 450, in various implementations, the method 400 includes establishing initial conditions and a current set of actions for the objective-effectuator based on the objective for the objective-effectuator. For example, referring to FIG. 2, the method 400 include establishing the initial/end states 256 for various objective-effectuators (e.g., character representations, equipment representations and/or the environment).

As represented by block 460, in various implementations, the method 400 includes modifying the objective-effectuator based on the objective. For example, referring to FIG. 2, in some implementations, the method 400 includes providing the objectives 254 to the display engine 260 and/or to one or more objective-effectuator engines.

Figure 5:
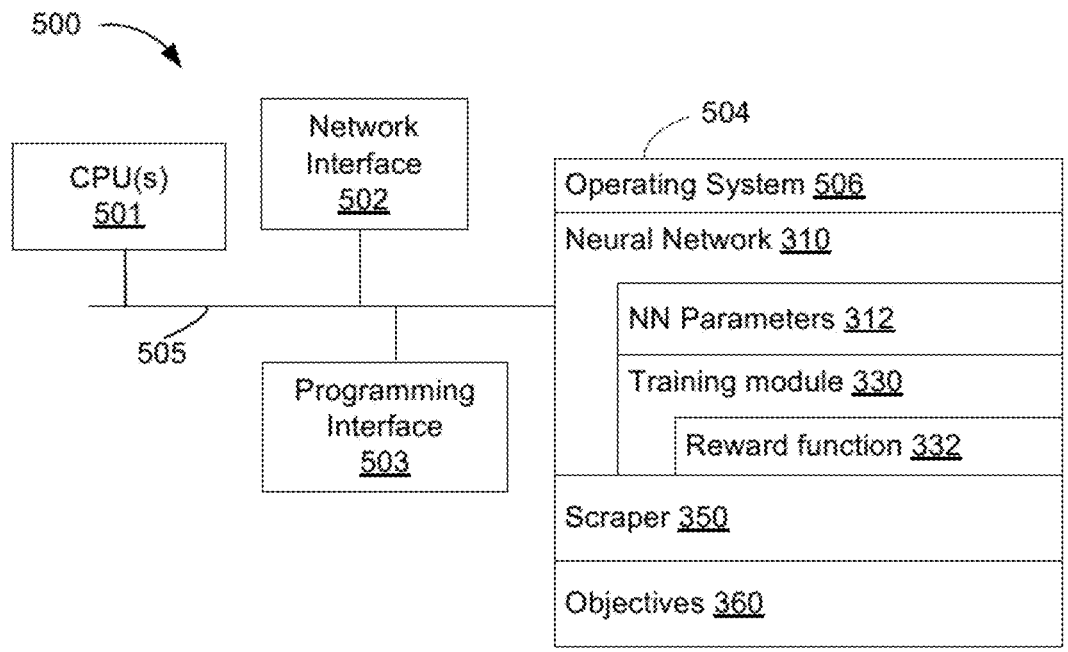
FIG. 5 is a block diagram of an electronic device in accordance with some implementations.

FIG. 5 is a block diagram of an electronic device 500 (e.g., enabled with one or more components of the controller 102 and/or the electronic device 103 shown in FIG. 1A or the HMD 104 shown in FIG. 1B) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the electronic device 500 includes one or more processing units (CPUs) 501, a network interface 502, a programming interface 503, a memory 504, and one or more communication buses 505 for interconnecting these and various other components.

In some implementations, the network interface 502 is provided to communicate with one or more local devices (e.g., via near-field communication or a local network) and/or one or more remote devices (e.g., WiFi, Ethernet, etc.). In some implementations, the one or more communication buses 505 include circuitry that interconnects and controls communications between system components. The memory 504 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the neural network 310, the training module 330, the scraper 350, and the possible objectives 360. As described herein, the neural network 310 is associated with the neural network parameters 312. As described herein, the training module 330 includes a reward function 332 that trains (e.g., configures) the neural network 310 (e.g., by determining the neural network parameters 312). As described herein, the neural network 310 determines objectives (e.g., the objectives 254 shown in FIGS. 2-3B) for objective-effectuators in an SR setting and/or for the environment of the SR setting. In some implementations, the memory 504 include at least a portion of the emergent content architectures in FIGS. 8A-8C.

In some implementations, the electronic device 500 optionally includes one or more input devices such as an eye tracker, touch-sensitive surface, keypad or keyboard, accelerometer, gyroscope, inertial measurement unit (IMU), grip sensor, one or more microphones, one or more buttons, one or more interior-facing image sensors, one or more exterior-facing image sensors, one or more depth sensors, one or more physiological sensors (e.g., heartbeat sensor, glucose level detector, etc.), one or more environmental sensors (e.g., barometer, humidity sensor, thermometer, ambient light detector, etc.), and/or the like. In some implementations, the electronic device 500 optionally includes one or more output/feedback devices such as a haptics engine, skin shear engine, one or more displays, one or more speakers, and/or the like.

Figure 6A:
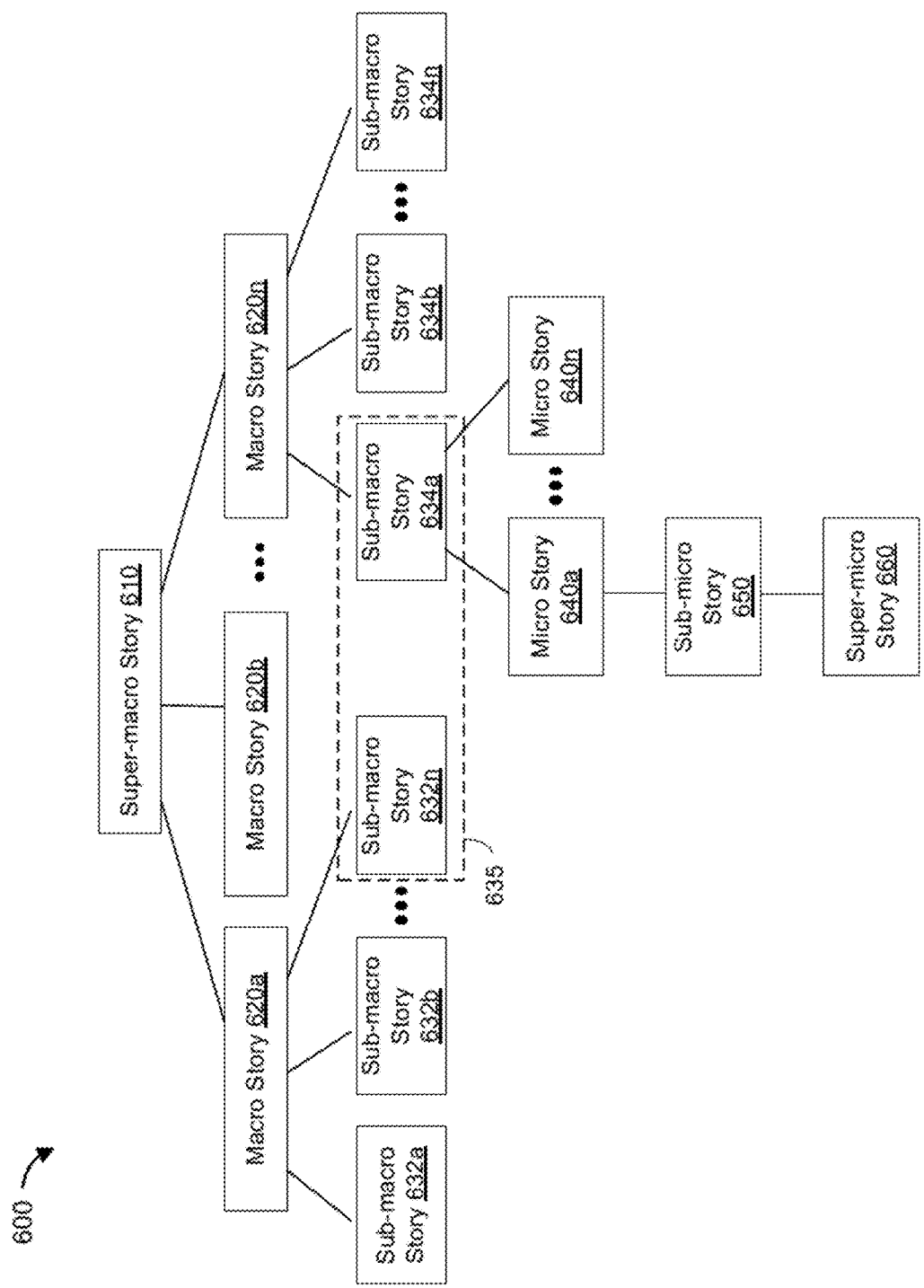
FIG. 6A is a block diagram of conditionally dependent synthesized reality (SR) content threads in accordance with some implementations.

FIG. 6A is a block diagram of conditionally dependent SR content threads 600 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the conditionally dependent SR content threads 600 correspond to a mesh of related content threads (e.g., stories, narratives, etc.) associated with a movie, TV episode, novel, theatrical play, or event such as an athletic event, ritual, coronation, inauguration, concert, opera, theatrical performance, battle, or other large-scale occurrence.

According to some implementations, the conditionally dependent SR content threads 600 includes a plurality of content threads (sometime also referred to herein as "stories" or "story nodes" for the sake of brevity) that are linked together in a tree, mesh, or web of inter-related stories. In some implementations, each of the plurality of stories within the conditionally dependent SR content threads 600 corresponds to a particular point-of-view of the event. In some implementations, each of the plurality of stories within the conditionally dependent SR content threads 600 is based on source assets/materials including, for example, plans for the event such as battle plans or an order of battle, ground truth for the event such as the course and outcomes of the battle, historical accounts and books, movies, video games, novels, and/or the like.

According to some implementations, the root of the conditionally dependent SR content threads 600 includes a super-macro story 610, which is, in turn, associated with one or more macro stories 620a, 620b, . . . , 620n (sometimes collectively referred to herein as macro stories 620). As shown in FIG. 6A, in some implementations, each of the macro stories 620 is associated with one or more sub-macro stories. For example, the macro story 620a is associated with sub-macro stories 632a, 632b, . . . , 632n (sometimes collectively referred to herein as sub-macro stories 632), and the macro story 620n is associated with sub-macro stories 634a, 634b, . . . , 634n (sometimes collectively referred to herein as sub-macro stories 634).

As shown in FIG. 6A, in some implementations, each of the sub-macro stories is associated with one or more micro stories. For example, the sub-macro story 634a is associated with micro stories 640a, . . . , 640n (sometimes collectively referred to herein as micro stories 640). In some implementations, each of the micro stories 640 is associated with one or more sub-micro stories and, in turn, each of the sub-micro stories is associated with one or more super-micro stories. As shown in FIG. 6, for example, the micro story 640a is associated with a sub-micro story 650, and the sub-micro story 650 is associated with a super-micro story 660.

As one example, the super-macro story 610 corresponds to the overall story associated with a particular battle of a war in the historical records. Continuing with this example, the macro stories 620 correspond to various military branches for the countries involved in a particular battle. As such, in this example, the macro story 620n corresponds to a naval military branch. Continuing with this example, the sub-macro stories 634 correspond to individual ships. As such, in this example, the sub-macro story 634a corresponds to a particular transport ship.

As shown in FIG. 6A, there is a relationship 635 between the sub-macro story 632n corresponding to a squadron of aircraft and the sub-macro story 634a. In this example, the squadron of aircraft are providing air support and defense for the particular transport ship (among other transport ships).

Continuing with this example, the micro stories 640 correspond to a plurality of amphibious landing craft being transported by the particular transport ship. Continuing with this example, the sub-micro story 650 corresponds to a platoon of infantry or marines assigned to respective amphibious landing craft among the plurality of amphibious landing craft being transported by the particular transport ship. Continuing with this example, the super-micro story 660 corresponds to a particular infantryman or marine assigned to the respective amphibious landing craft.

In some implementations, a user is presented SR content associated with an omniscient third-person view of the super-macro story 610 (e.g., a particular battle). The user may switch to another point-of-view within the conditionally dependent SR content threads 600 in order to view SR content associated with the selected point-of-view within the conditionally dependent SR content threads 600 such as the perspective of the naval military branch associated with macro story 620n, the perspective of the particular transport ship associated with the sub-macro story 634a, the perspective of the respective amphibious landing craft 640a, the perspective of the platoon of infantry or marines associated with sub-micro story 650, or the perspective the particular infantryman or marine assigned to the respective amphibious landing craft associated with the super-micro story 660.

According to some implementations, a node of the conditionally dependent SR content threads 600 may be removed by the user in order to view a simulation of the event that excludes the particular node and associated child nodes. According to some implementations, a node may be added to the conditionally dependent SR content threads 600 by the user in order to view a simulation of the event that includes the particular node and associated child nodes.

Figure 6B:
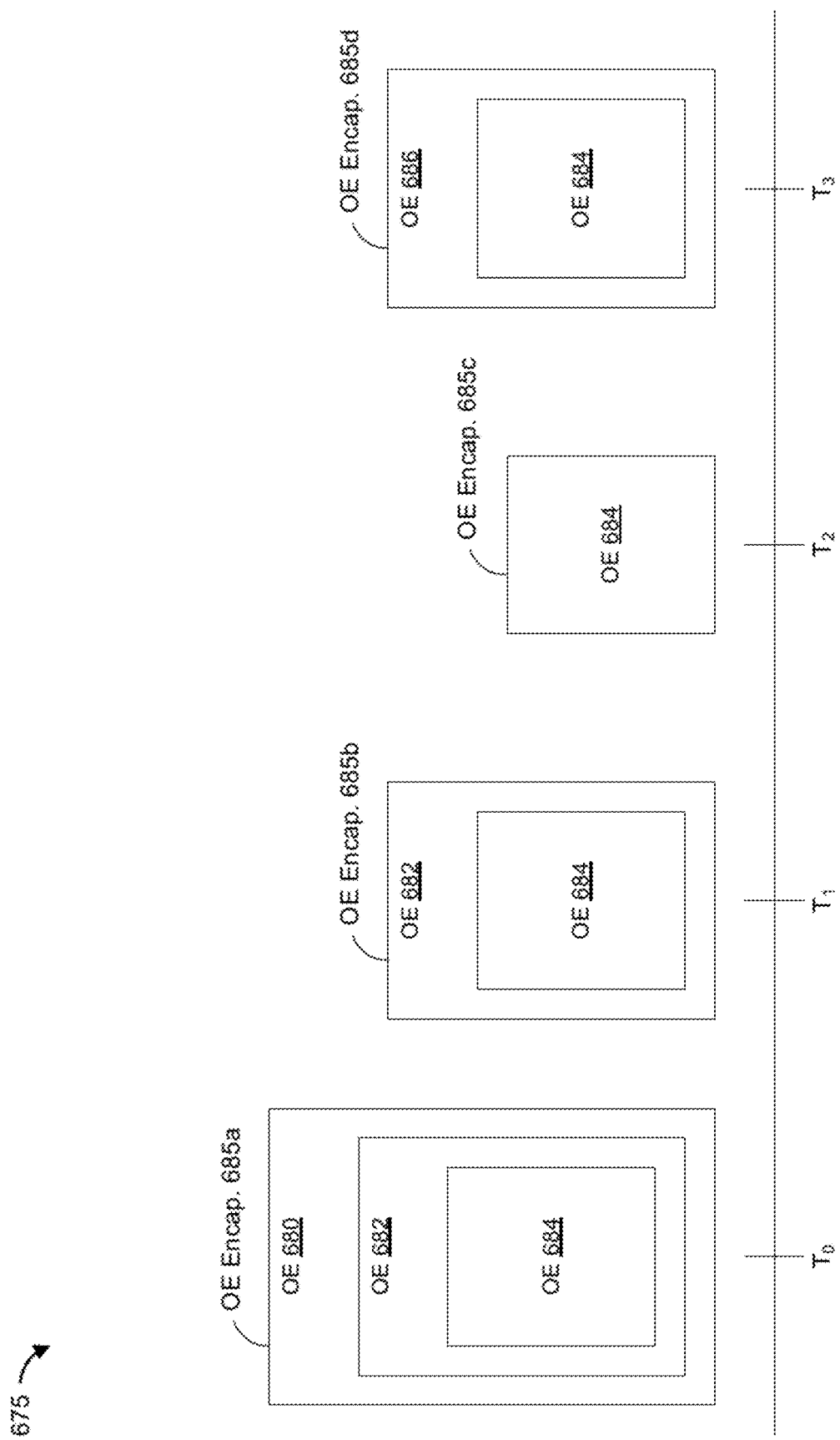
FIGS. 6B and 6C illustrate timelines associated with objective-effectuator (OE) encapsulations in accordance with some implementations.

FIG. 6B is a block diagram of a timeline 675 associated with an objective-effectuator (OE) encapsulation in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, as shown in FIG. 6B, the timeline 675 illustrates the state of an OE encapsulation from the point-of-view of a lowest-level OE 684 at a plurality of time periods or temporal points $T_0$, $T_1$, $T_2$, and $T_3$.

In some implementations, an OE encapsulation includes a plurality of conditional, related, correlated, associated, or dependent OEs that are encapsulated or nested based on contextual information. In some implementations, each OE corresponds to a character within a synthesized reality (SR) setting. As one example, an OE encapsulation corresponds to a set of related characters or entities such as a transport ship including N amphibious landing crafts each with M marines. In this example, the lowest-level OE is an individual marine that is encapsulated/nested within his company, which, in turn, is encapsulated/nested within the amphibious land craft. Continuing with this example, the amphibious land craft is encapsulated/nested within the transport ship.

In some implementations, when the first OE is encapsulated within the second OE, the first OE is associated with the second OE. In some implementations, when the first OE is encapsulated within the second OE, the first OE is correlated with the second OE. In some implementations, when the first OE is encapsulated within the second OE, the first OE is related to the second OE. In some implementations, when the first OE is encapsulated within the second OE, the first OE is dependent on the second OE. In other words, the first OE is provided objectives and performs actions that are consistent with the context and attributes of the second OE because the first OE is encapsulated within the second OE.

As shown in FIG. 6B, at time $T_0$, the OE encapsulation 685a includes an OE 684 encapsulated/nested within an OE 682, which, in turn, is encapsulated/nested within an OE 680. For example, at time $T_0$, while approaching a beach to make an amphibious landing, the OE encapsulation 685a includes the OE 684 (e.g., an individual marine) encapsulated/nested within the OE 682 (e.g., a company of marines), which, in turn, is encapsulated/nested within an OE 680 (e.g., an amphibious landing craft).

In some implementations, when a first OE is encapsulated/nested within a second OE, the first OE is provided an objective based on the context of the second OE within which it is encapsulated and, in turn, the first OE performs actions that are consistent with that context. As an example, a marine on a transport ship is not given a scouting objective to perform scouting patrols or a fire suppression objective to mortar a target while on the transport ship. In some implementations, the lower-level OE performs actions consistent with higher-level OEs in its encapsulation. In some implementations, one or more other lower-level OEs are encapsulated within the first OE. In some implementations, the second OE is encapsulated within one or more other higher-level OEs.

In some implementations, the system determines a set of OE encapsulations for each time period of the event. As such, an OE encapsulation may change over the course of the event such as OEs (layers) being stripped away or added. As one example, a particular battle encapsulation starts as transport ship→amphibious assault vehicle→company of marines→individual marine while in transport ($T_0$). Continuing with this example, the OE encapsulation changes to amphibious assault vehicle→company of marines→individual marine while approaching the beach ($T_1$). Continuing with this example, the OE encapsulation changes again to company of marines→individual marine while storming the beach ($T_2$). Continuing with this example, the OE encapsulation changes again when the marines may find and enter a vehicle after reaching the beach ($T_3$) which changes the encapsulation to vehicle→subset of company of marines-→individual marine.

As shown in FIG. 6B, at time $T_1$, the OE encapsulation 685b includes the OE 684 encapsulated/nested within the OE 682. For example, at time $T_1$, after landing on a beach, the OE encapsulation 685b includes the OE 684 (e.g., the individual marine) encapsulated/nested within the OE 682 (e.g., the company of marines).

As shown in FIG. 6B, at time $T_2$, the OE encapsulation 685c includes the OE 684. For example, at time $T_2$, after landing on a beach and completing a mission, the OE encapsulation 685c includes the OE 684 (e.g., the individual marine) apparat from the OE 682.

As shown in FIG. 6B, at time $T_3$, the OE encapsulation 685d includes the OE 684 encapsulated/nested within the OE 686. For example, at time $T_3$, after landing on a beach and reaching a rendezvous point, the OE encapsulation 685d includes the OE 684 (e.g., the individual marine) encapsulated/nested within the OE 686 (e.g., an evacuation helicopter or truck).

Figure 6C:
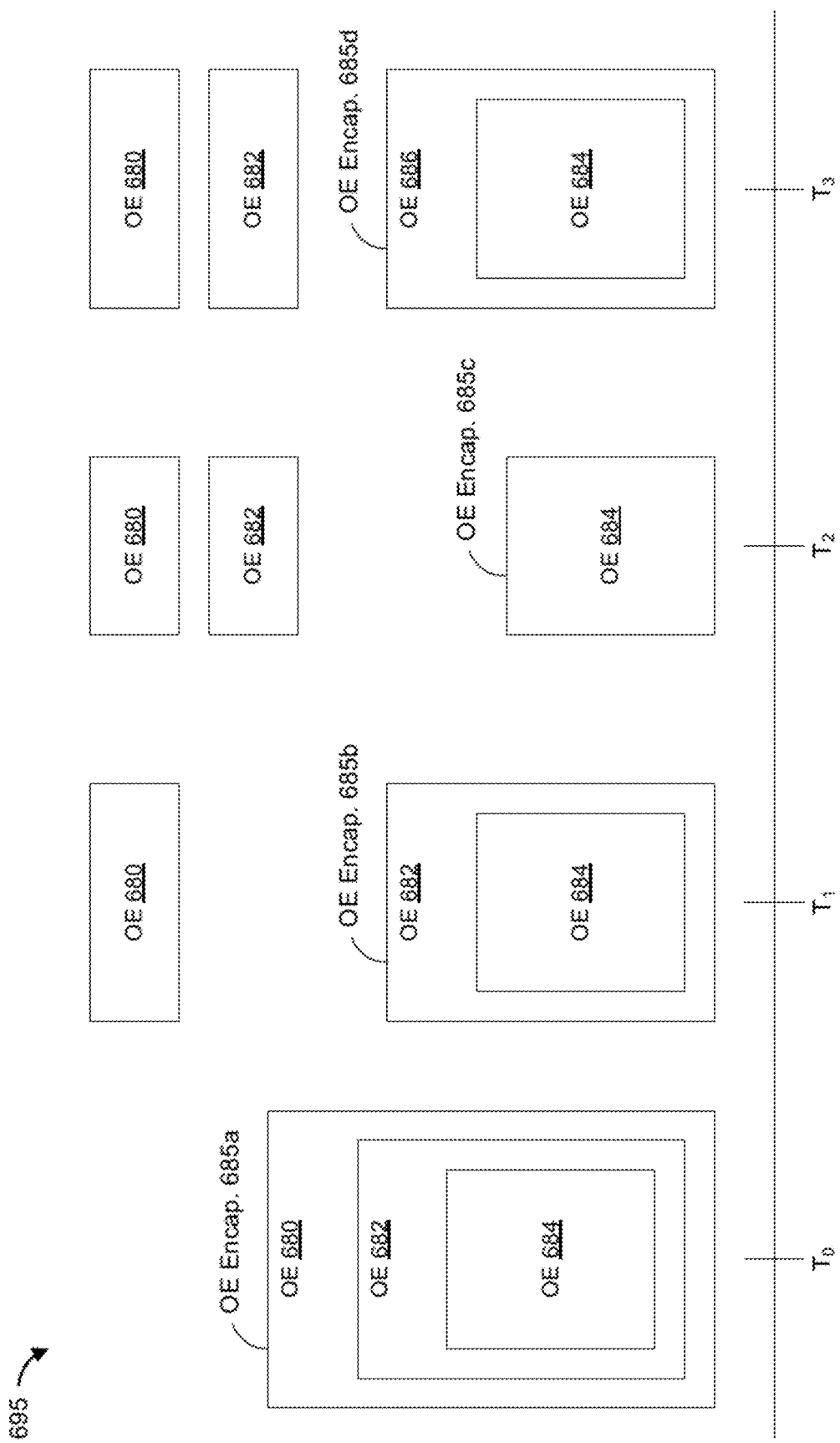

FIG. 6C is a block diagram of a timeline 695 associated with an objective-effectuator (OE) encapsulation in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, the timeline 695 is related to the timeline 675 in FIG. 6B. The time 695 illustrates the parallel functioning of the OEs even after the OE encapsulation changes over the time periods or temporal points $T_0$, $T_1$, $T_2$, and $T_3$. In other words, FIG. 6C illustrates the OEs 680 and 682 that are stripped away from the OE encapsulation 685a and 685b over time continuing to function in parallel with the OE 684.

Figure 7A:
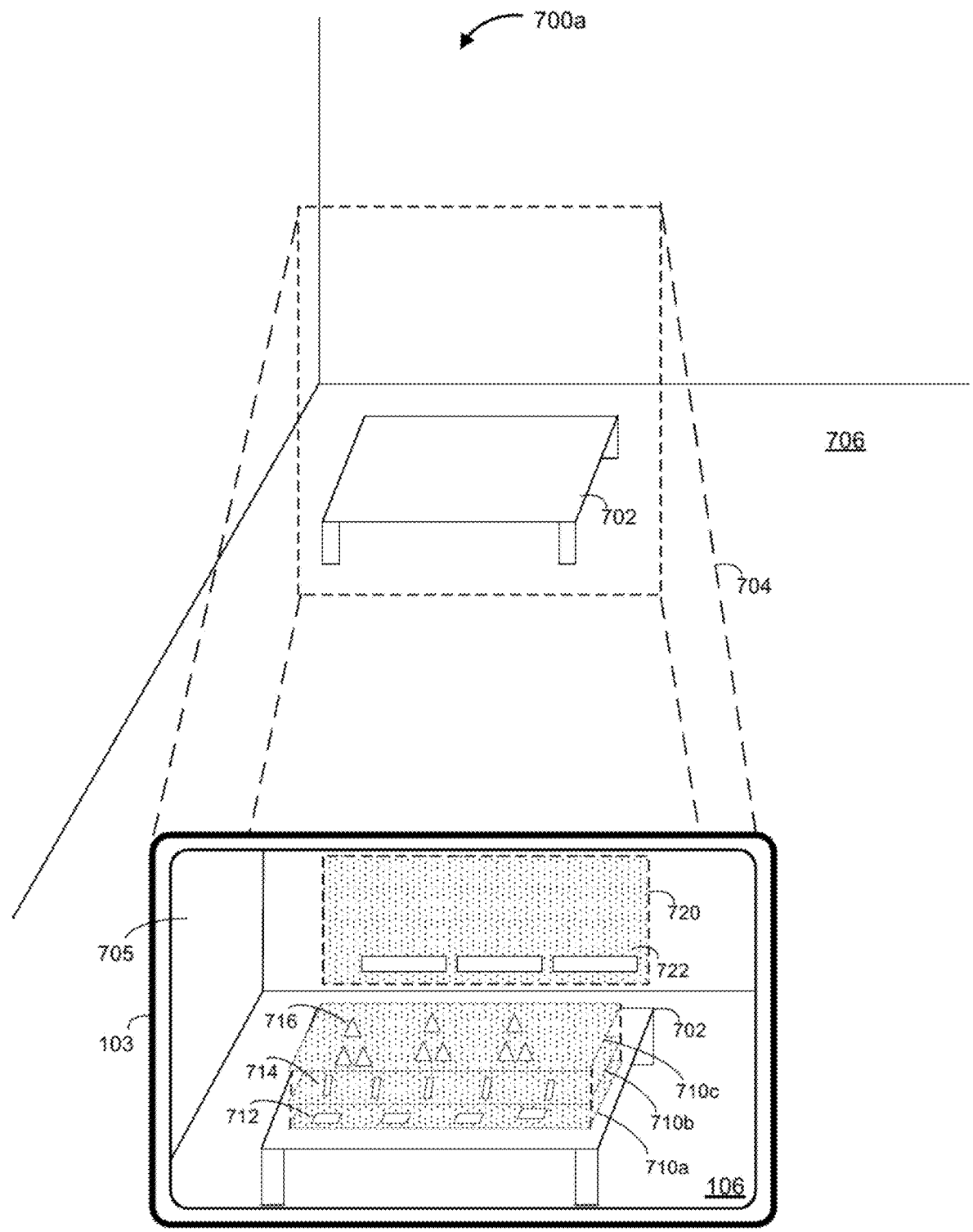
FIGS. 7A-7C illustrate example SR settings in accordance with some implementations.
Figure 7B:
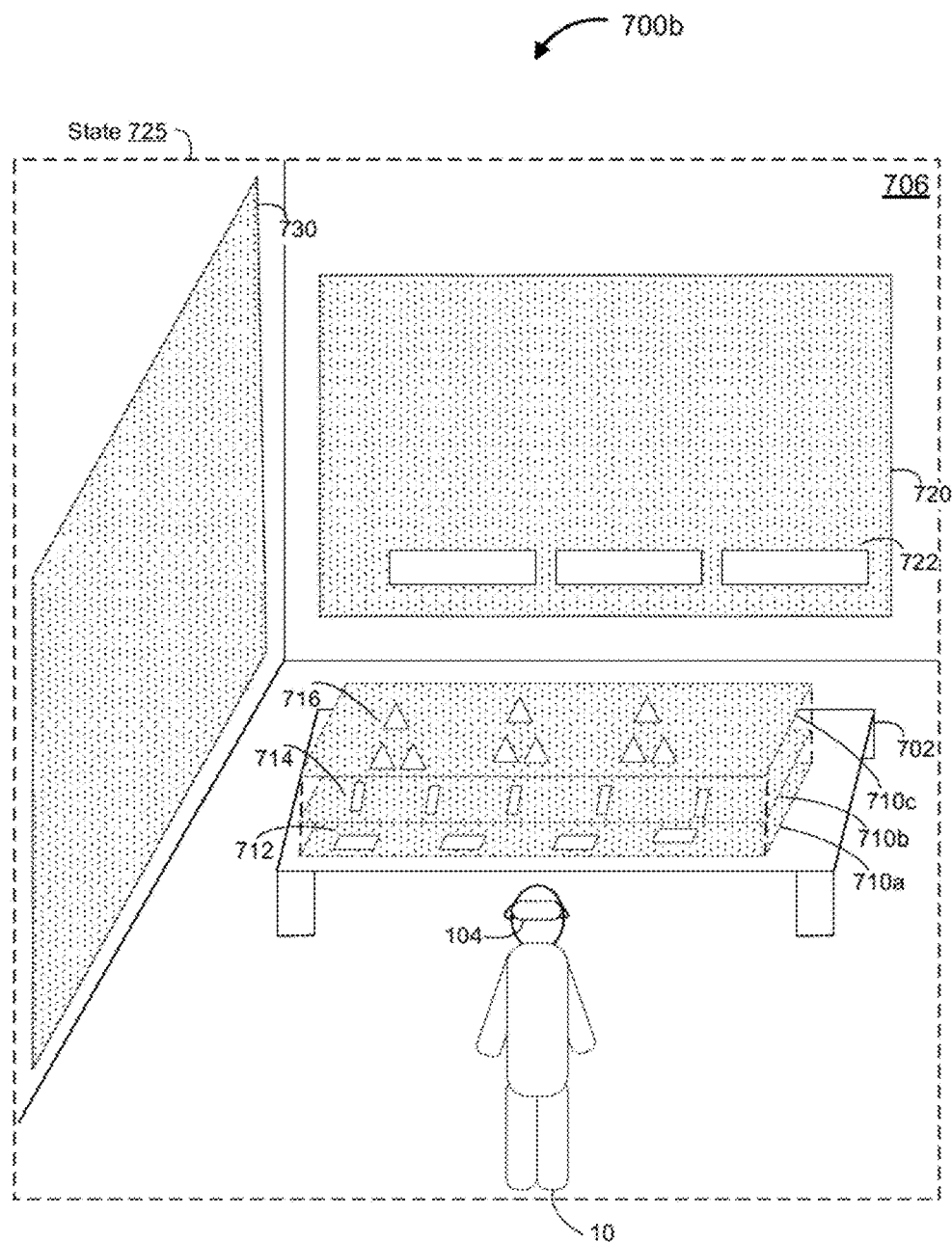
Figure 7C:
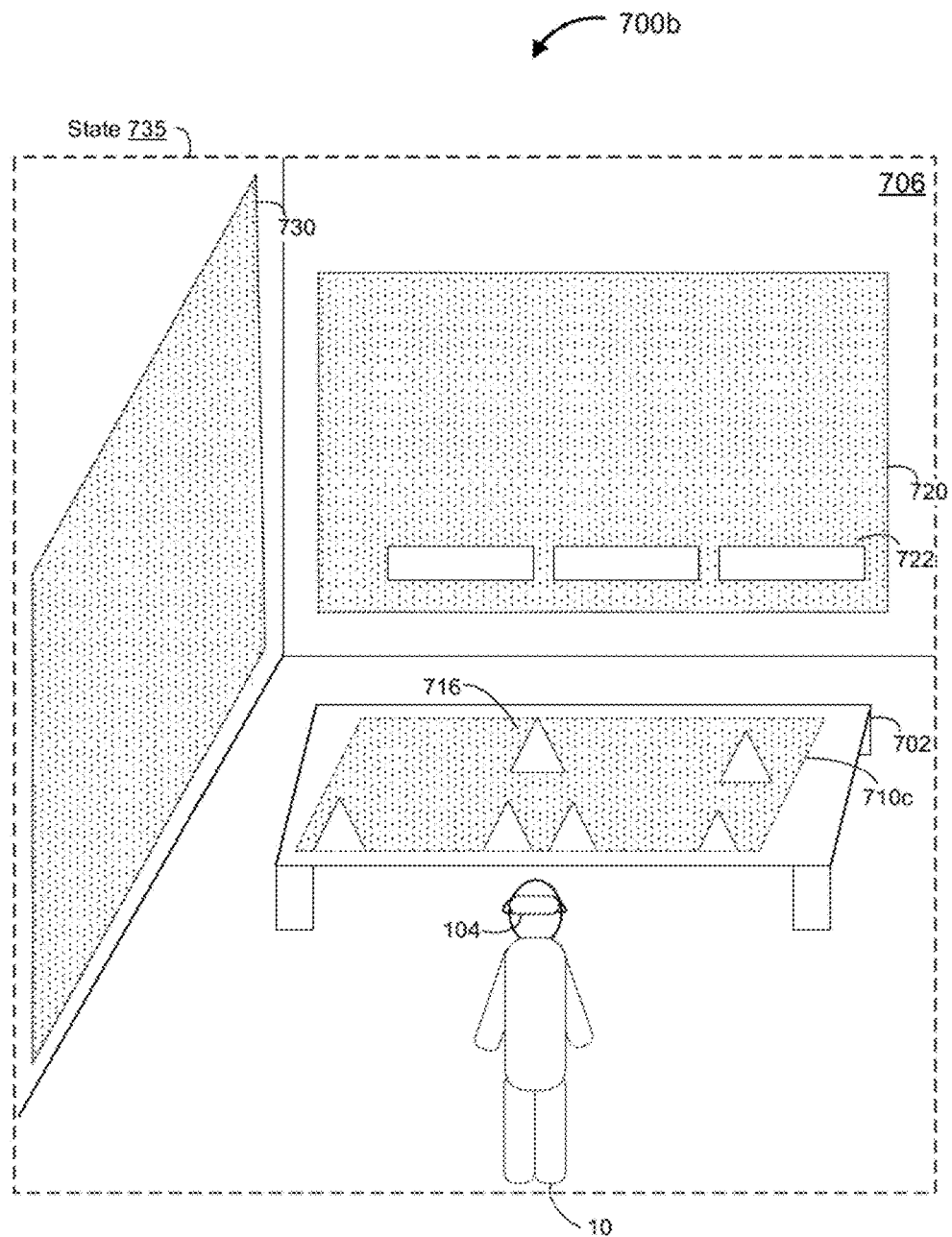

FIGS. 7A-7C illustrate example SR settings 700a and 700b in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 7A illustrates an example SR setting 700a. As shown in FIG. 7A, the physical setting 706 includes a table 702. In this example, a portion of the physical setting 706 is within the field-of-view 704 of the electronic device 103, where the field-of-view 704 is associated with an external facing image sensor of the electronic device 103 (e.g., a tablet or mobile phone). In other words, the user is looking at the table 702 from a side or perspective orientation through the electronic device 103. As such, the portion of the physical setting 706, including the table 702, is displayed on the display 705 of the electronic device 103 (e.g., a live video stream or video pass-through of the physical setting 706). As shown in FIG. 7A, the electronic device 103 displays an SR setting 106 on the display 705 that includes SR content superimposed on or composited with the table 702 and the wall.

As shown in FIG. 7A, for example, the SR content (e.g., associated with a particular battle) overlaid or superimposed on the table 702 includes a first SR content layer 710a (e.g., an underwater layer) with SR content elements 712 (e.g., sunken ships, sunken amphibious landing craft, underwater mines, and/or the like), a second AR content layer 710b (e.g., a water surface layer) with SR content elements 714 (e.g., amphibious landing craft with platoons of infantrymen or marines, transport ships, and/or the like), and a third SR content layer 710c (e.g., an aerial layer) with SR content elements 716 (e.g., aircraft, dirigibles, shells, and/or the like). As shown in FIG. 7A, for example, the SR content 720 overlaid on the wall includes SR content elements 722 (e.g., defensive position, stationary guns, and/or the like on land). One of ordinary skill in the art will appreciate that the number, structure, dimensions, and placement of the SR content layers and associated SR content elements in FIG. 7A is arbitrary and may be changed in various other implementations.

FIGS. 7B and 7C illustrate an example SR setting 700b. As shown in FIGS. 7B and 7C, as one example, the user 10 wears the HMD 104 his/her head (e.g., AR-enabled glasses) with optical see-through of the physical setting 706 (e.g., the user's living room). As shown in FIGS. 7B and 7C, as another example, the user 10 wears the HMD 104 on his/her head (e.g., an SR-enabled headset) with video pass-through of the physical setting 706 (e.g., the user's living room).

As shown in FIG. 7B, in state 725 (e.g., associated with time period $T_1$), the HMD 104 superimposes or overlays SR content on the table 702 and the walls of the physical setting 706. In this example, with reference to state 725, the SR content (e.g., associated with a particular battle) overlaid on the table 702 includes a first SR content layer 710a (e.g., an underwater layer) with SR content elements 712 (e.g., sunken ships, sunken amphibious landing craft, underwater mines, and/or the like), a second SR content layer 710b (e.g., a water surface layer) with SR content elements 714 (e.g., amphibious landing craft with platoons of infantrymen or marines, transport ships, and/or the like), and a third SR content layer 710c (e.g., an aerial layer) with SR content elements 716 (e.g., aircraft, dirigibles, shells, and/or the like). As shown in FIG. 7B, with reference to state 725, the SR content elements 720 overlaid on the front wall includes SR content elements 722 (e.g., defensive position, stationary guns, and/or the like on land), and the SR content elements 730 overlaid on the side wall includes peripheral or environment details. One of ordinary skill in the art will appreciate that the number, structure, dimensions, and placement of the SR content layers and associated SR content elements in FIG. 7B is arbitrary and may be changed in various other implementations.

As shown in FIG. 7B, state 725 corresponds to a first SR view of the event such as an omniscient third-person view of the overall event (e.g., a particular battle). In response to receiving an input from the user 10 (e.g., a voice command, gesture, or the like) selecting the third AR content layer 710c (e.g., an aerial layer), the HMD 104 presents a second SR view of the event associated with the third SR content layer 710c (e.g., an aerial layer).

As shown in FIG. 7C, in state 735 (e.g., associated with time period $T_2$), the HMD 104 updates the SR content superimposed or overlaid on the table 702 in response to the selectin of the third AR content layer 710c. As shown in FIG. 7C, in state 735, the HMD 104 superimposes or overlays SR content on the table 702 that corresponds to the third SR content layer 710c. In this example, with reference to state 735, the SR content (e.g., associated with a particular battle) overlaid on the table 702 includes the third SR content layer 710c (e.g., an aerial layer) with SR content elements 716 (e.g., aircraft, dirigibles, shells, and/or the like). For example, in FIG. 7C, the third SR content layer 710c corresponds to a center of gravity of a squadron of aircraft on approach to attack the defensive positions on within a battle site. As another example, in state 735, the user 10 may be presented the point-of-view of a particular pilot among the squadron of aircraft on approach to attack the defensive positions on a battle site (not shown).

Figure 8A:
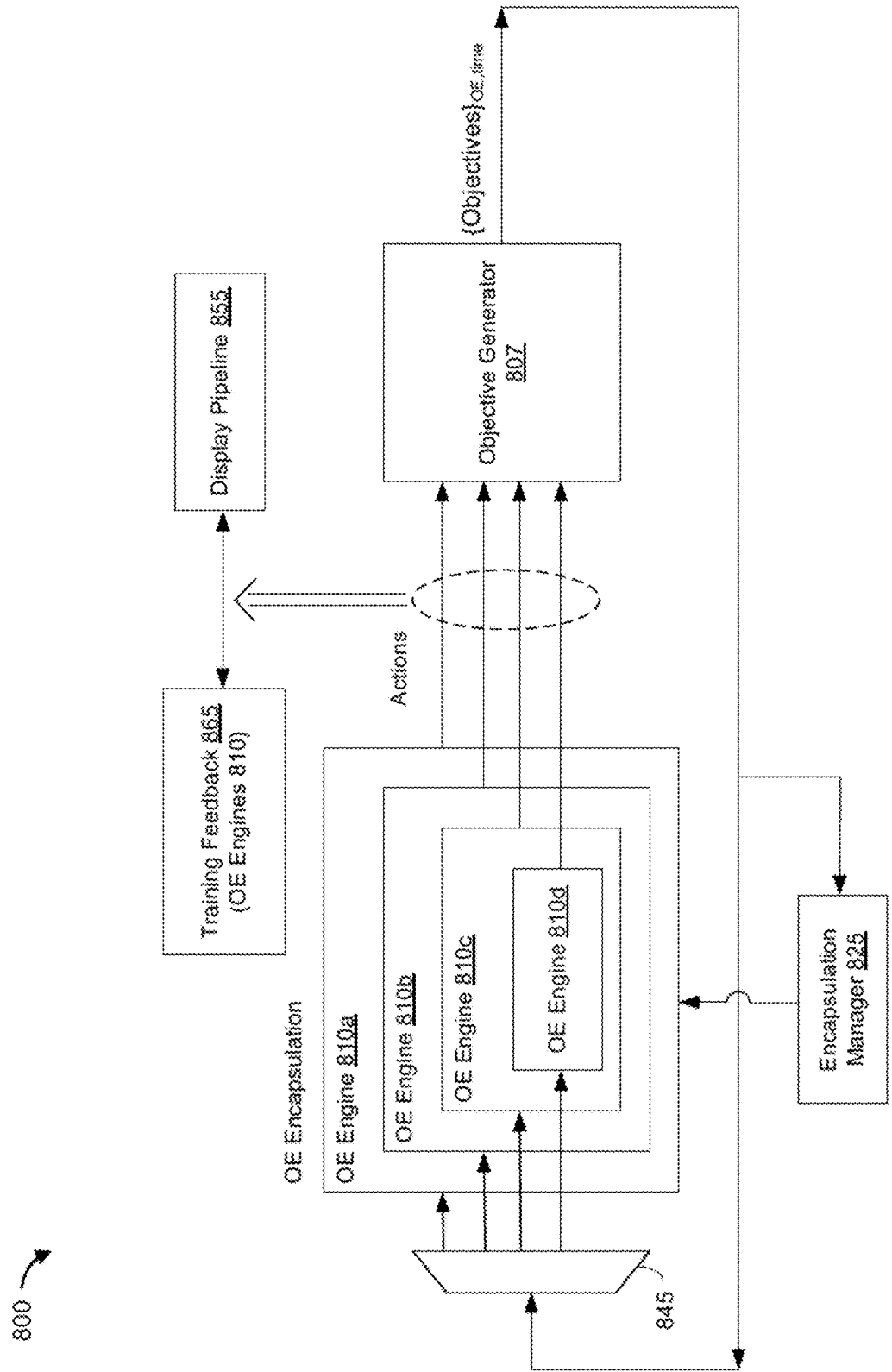
FIGS. 8A-8C are block diagrams of emergent content architectures in accordance with some implementations.

FIG. 8A is a block diagram of an emergent content architecture 800 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, an objective-effectuator (OE) encapsulation of related (e.g., encapsulated/nested) OE engines 810a, 810b, 810c, and 810d (sometimes collectively referred to herein as the OE engines 810) (e.g., similar to character engines 208a-e in FIG. 2) perform actions based on objectives derived from the objective generator 807.

As one example, the OE encapsulation includes a top-level OE engine 810a associated with a transport ship, a second-level OE engine 810b associated with an amphibious landing craft being transported by the transport ship, a third-level OE engine 810c associated a platoon of infantrymen or marine assigned to the amphibious landing craft, and a bottom-level OE engine 810d associated with a particular infantryman or marine. As such, the various OE engines within the OE encapsulation are related in some manner as they correspond to connected nodes within a conditionally dependent SR content threads associated with the event (e.g., as described with reference to the story nodes in FIG. 6A). According to some implementations, the emergent content architecture 800 is structured to produce concurrent actions for the various OE engines within the OE encapsulation for consistent content. In various implementations, one of ordinary skill in the art will appreciate that emergent content architecture 800 may include an arbitrary number of OE encapsulations. In some implementations, a same OE engine may be shared between two or more OE encapsulations due to the related nature of OEs to OE encapsulations.

According to some implementations, the objective generator 807 (e.g., a neural network or other AI construct) produces objectives for each OE per time period based on a bank of predetermined objectives, previous objectives, source assets, and/or other information (e.g., similar to the emergent content engine 250 in FIG. 2). According to some implementations, the encapsulation manager 825 determines the OE encapsulation (e.g., the nesting or layering of related OEs). For example, the encapsulation manager 825 determines the OE encapsulation based on the connections between the story nodes within conditionally dependent SR content threads associated with the event. In some implementations, the encapsulation manager 825 modifies the OE encapsulation over time (e.g., adding or removing layers of OEs) based on the objectives, source assets, and/or other information.

In some implementations, the demultiplexer 845 routes the objectives on a per OE basis to their respective OE engines 810. In some implementations, the OE engines 810 perform actions based on their objectives. According to some implementations, the actions for a time period are captured and provided to a display pipeline 855 for rendering and display in order to present the SR content associated with the event to a user (e.g., an SR reconstruction or simulation of a battle or other event based on the source assets then emergent content). According to some implementations, the actions for a time period are captured and provided to the OE engines 810 as training feedback 865. According to some implementations, the actions are provided to the objective generator 807 which in turn produces updated objective for each OE per time period (e.g., as described above with reference to the emergent content engine 250 in FIG. 2).

Figure 8B:
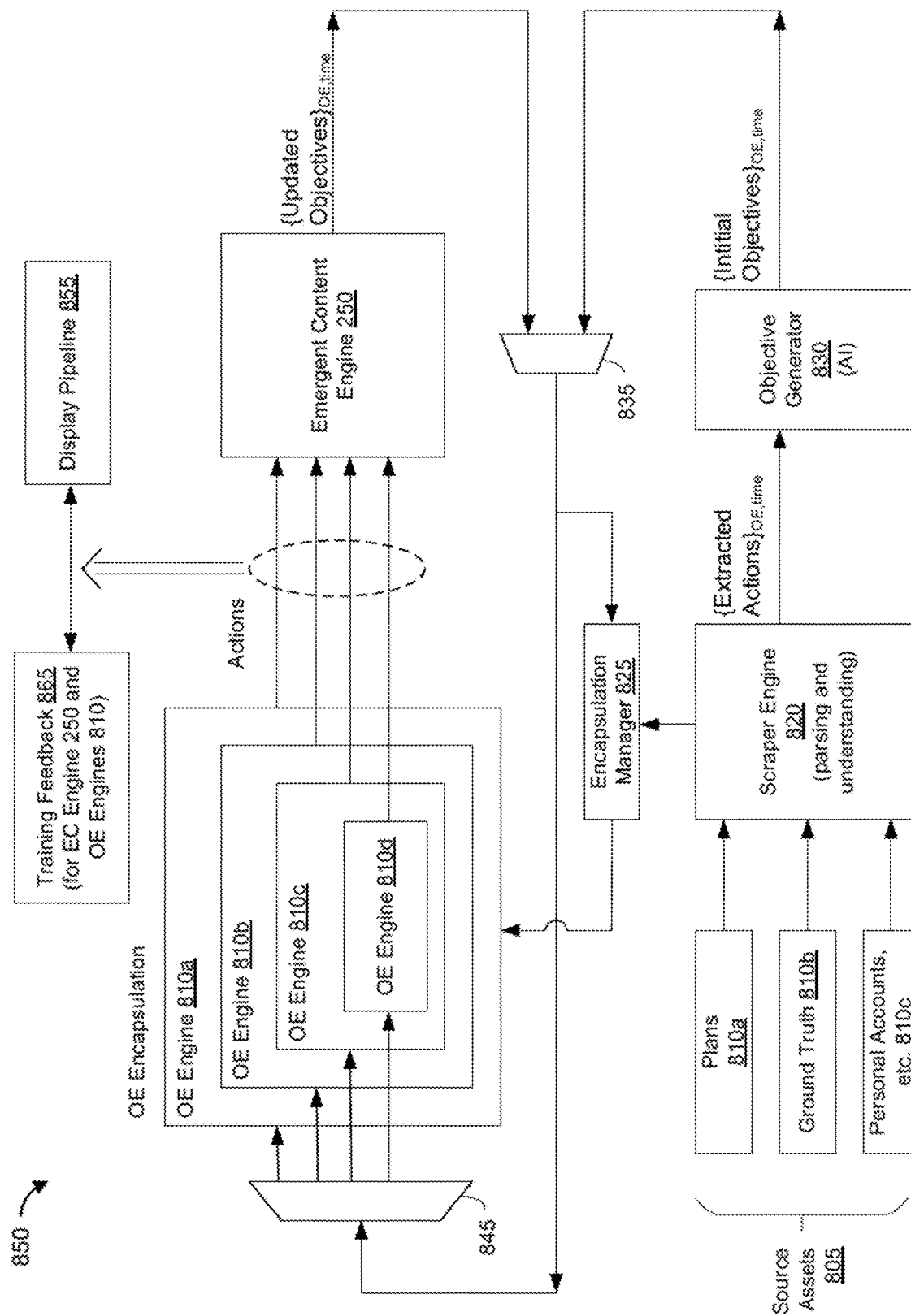

FIG. 8B is a block diagram of an emergent content architecture 850 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, an objective-effectuator (OE) encapsulation of related (e.g., encapsulated/nested) OE engines 810a, 810b, 810c, and 810d (sometimes collectively referred to herein as the OE engines 810) (e.g., similar to character engines 208a-e in FIG. 2) perform actions based on initial objectives derived from source assets 805 at time $T_0$ and based on updated objectives derived from the emergent content engine 250 at times $T_1$ and on.

According to some implementations, the encapsulation manager 825 determines the OE encapsulation (e.g., the nesting or layering of related OEs). For example, the encapsulation manager 825 determines the OE encapsulation based on the connections between the story nodes within a conditionally dependent SR content threads associated with the event. In some implementations, the encapsulation manager 825 modifies the OE encapsulation over time (e.g., adding or removing layers of OEs) based on the objectives, source assets, and/or other information.

As one example, the OE encapsulation includes a top-level OE engine 810*a* associated with a transport ship, a second-level OE engine 810*b* associated with an amphibious landing craft being transported by the transport ship, a third-level OE engine 810*c* associated a platoon of infantrymen or marine assigned to the amphibious landing craft, and a bottom-level OE engine 810*d* associated with a particular infantryman or marine. As such, the various OE engines within the OE encapsulation are related in some manner as they correspond to connected nodes within a conditionally dependent SR content threads associated with the event (e.g., as described with reference to the story nodes in FIG. 6A). According to some implementations, the emergent content architecture 850 is structured to produce concurrent actions for the various OE engines within the OE encapsulation for consistent emergent content. In various implementations, one of ordinary skill in the art will appreciate that emergent content architecture 850 may include an arbitrary number of OE encapsulations. In some implementations, a same OE engine may be shared between two or more OE encapsulations due to the related nature of OEs to OE encapsulations.

According to some implementations, the initial objectives are produced by the operations of a scraper engine 820 and an objective generator 830 based on source assets 805 associated with an event (e.g., plans 810*a*, ground truth 810*b*, and personal accounts or the like 810*c* for the event). In some implementations, the scraper engine 820 performs parsing and understanding operations on the source assets 805 in order to produce extracted actions for each OE (e.g., characters identified in the source assets 805) per time period. For example, in some implementations, the scraper engine 820 extracts the actions from the source assets 805. Thereafter, in some implementations, the objective generator 830 (e.g., a neural network or other AI construct) produces initial objectives for each OE per time period.

According to some implementations, a multiplexer 835 enables one of the initial objectives or the updated objectives as inputs to the OE encapsulation. In some implementations, the demultiplexer 845 routes the objectives on a per OE basis to their respective OE engines 810. In some implementations, the OE engines 810 perform actions based on their objectives. According to some implementations, the actions for a time period are captured and provided to a display pipeline 855 for rendering and display in order to present the SR content associated with the event to a user (e.g., an SR reconstruction or simulation of a battle or other event based on the source assets then emergent content). According to some implementations, the actions for a time period are captured and provided to the emergent content engine 250 and the OE engines 810 as training feedback 865. According to some implementations, the actions are provided to the emergent content engine 250 which in turn produces updated objective for each OE per time period (e.g., as described above with reference to the emergent content engine 250 in FIG. 2).

Figure 8C:
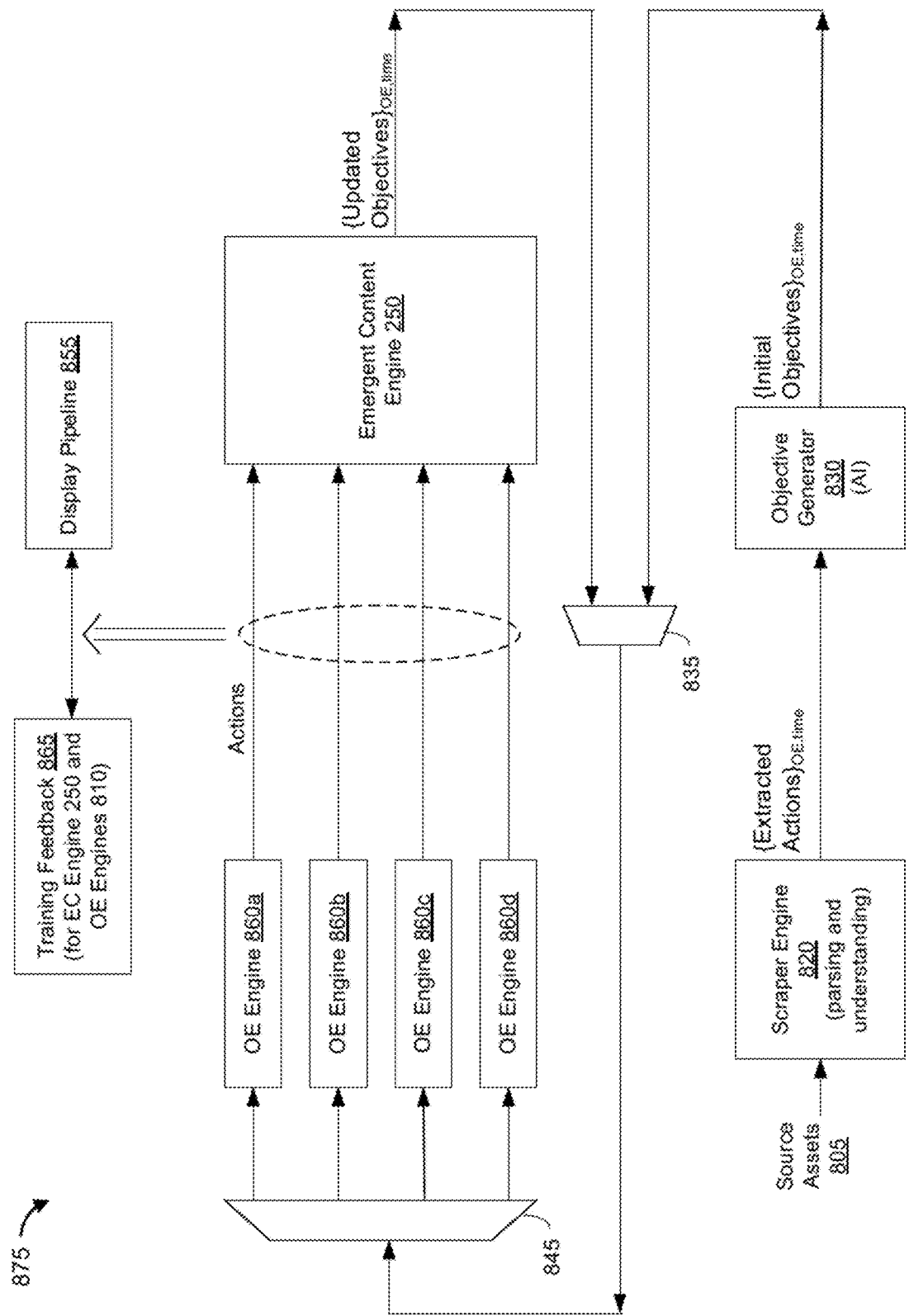

FIG. 8C is a block diagram of an emergent content architecture 875 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, OE engines 860*a*, 860*b*, 860*c*, and 860*d* (sometimes collectively referred to herein as the OE engines 860) (e.g., similar to character engines 208*a-e* in FIG. 2) perform actions based on initial objectives derived from source assets 805 at time $T_0$ and based on updated objectives derived from the emergent content engine 250 at times $T_1$ and on.

According to some implementations, the initial objectives are produced by the operations of a scraper engine 820 and an objective generator 830 based on source assets 805 (e.g., a movie, TV episode, audio book, novel, magazine article, etc.). In some implementations, the scraper engine 820 performs parsing and understanding operations on the source assets 805 in order to produce extracted actions for each OE (e.g., characters identified in the source assets 805) per time period. For example, in some implementations, the scraper engine 820 extracts the actions from the source assets 805. Thereafter, in some implementations, the objective generator 830 (e.g., a neural network or other AI construct) produces initial objectives for each OE per time period.

According to some implementations, the multiplexer 835 enables one of the initial objectives or the updated objectives as inputs to the OE engines 860. In some implementations, the demultiplexer 845 routes the objectives on a per OE basis to their respective OE engines 860. In some implementations, the OE engines 860 perform actions based on their objectives. According to some implementations, the actions for a time period are captured and provided to a display pipeline 855 for rendering and display in order to present the SR content associated with the event to a user (e.g., an SR reconstruction or simulation of a battle or other event based on the source assets then emergent content). According to some implementations, the actions for a time period are captured and provided to the emergent content engine 250 and the OE engines 860 as training feedback 865. According to some implementations, the actions are provided to the emergent content engine 250 which in turn produces updated objective for each OE per time period (e.g., as described above with reference to the emergent content engine 250 in FIG. 2).

FIGS. 9A-9F illustrate a plurality of SR settings from different viewing vectors in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the plurality of SR settings shown in FIGS. 9A-9F correspond to predetermined content (e.g., screenplay, theatrical play, movie, TV show, historical event, fictional story, live event, or the like). According to some implementations, the plurality of SR settings shown in FIGS. 9A-9F correspond to emergent content that is based at least in part on source assets (e.g., initial or seed content), such as a movie, TV episode, video game, historical event, or the like, as described with reference to FIGS. 8A and 8B. According to some implementations, the plurality of SR settings shown in FIGS. 9A-9F correspond to the conditionally dependent SR content threads 600 described in FIG. 6A.

Figure 9A:
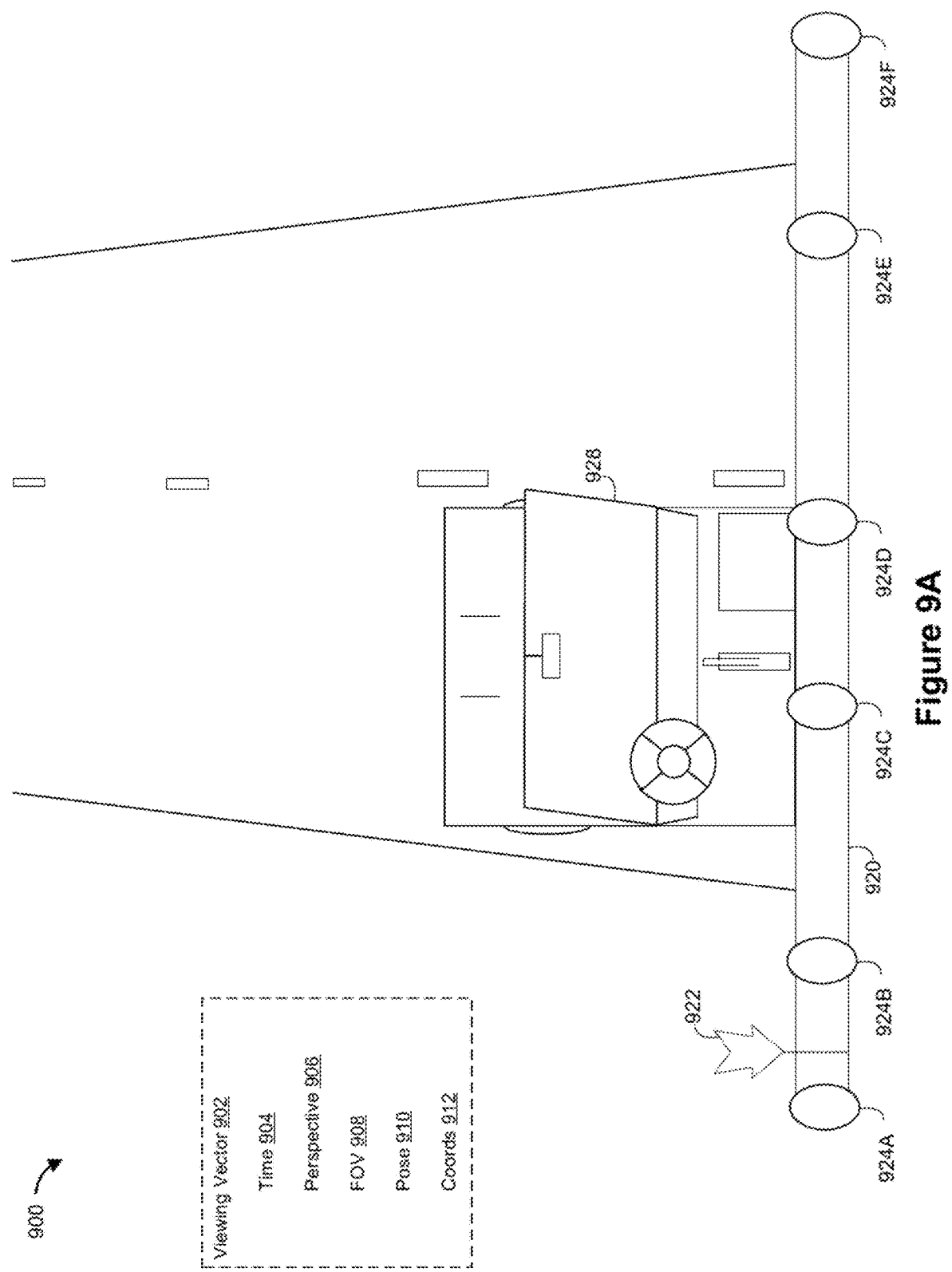
FIGS. 9A-9F illustrate a plurality of example SR settings from different viewing vectors in accordance with some implementations.

FIG. 9A illustrates an example SR setting 900 presented from a viewing vector 902 at time 904. As shown in FIG. 9A, the SR setting 900 corresponds to a first SR setting (e.g., a driving setting) presented by the electronic device 103 or the HMD 104, including a vehicle 928. According to some implementations, the viewing vector 902 is characterized by a perspective 906, a field-of-view (FOV) 908, a pose 910, and a set of coordinates 912. In FIG. 9A, the perspective 906 corresponds to a vehicle 928 within the first SR setting, the FOV 908 corresponds to a size, shape, focal length, etc. of a viewing field associated with the vehicle 928, the pose 910 corresponds to rotational coordinates associated with the FOV 908, and the set of coordinates 912 corresponds to the translational coordinates that characterize a location associated with the FOV 908 within the first SR setting.

In FIG. 9A, the SR setting 900 includes a navigation timeline 920 with a current time indicator 922 and a plurality of viewing vector affordances 924A, 924B, 924C, 924D, 924E, and 924F (sometimes referred to collectively herein as the viewing vector affordances 924). According to some implementations, each of the viewing vector affordances 924 is associated with a different viewing vector at respective times on the navigation timeline 920. In some implementations, each of the viewing vector affordances is associated with an OE that corresponds to a story node within the conditionally dependent SR content threads 600. In some implementations, each of the viewing vector affordances is associated with an OE encapsulation that corresponds to a story node within the conditionally dependent SR content threads 600.

For example, the electronic device 103 or the HMD 104 detects a first input selecting the viewing vector affordance 924B at time 904 such as a voice command, gesture input, touch input, gaze direction input, or the like from a user of the electronic device 103 or the HMD 104 via one or more input devices (e.g., microphone, gaze tracker, body pose estimator, touch-sensitive surface, buttons, etc.). Continuing with this example, in response to detecting the first input selecting the viewing vector affordance 924B, FIG. 9B illustrates an example SR setting 930A presented from a viewing vector 932A at time 934 associated with the viewing vector affordance 924B.

Figure 9B:
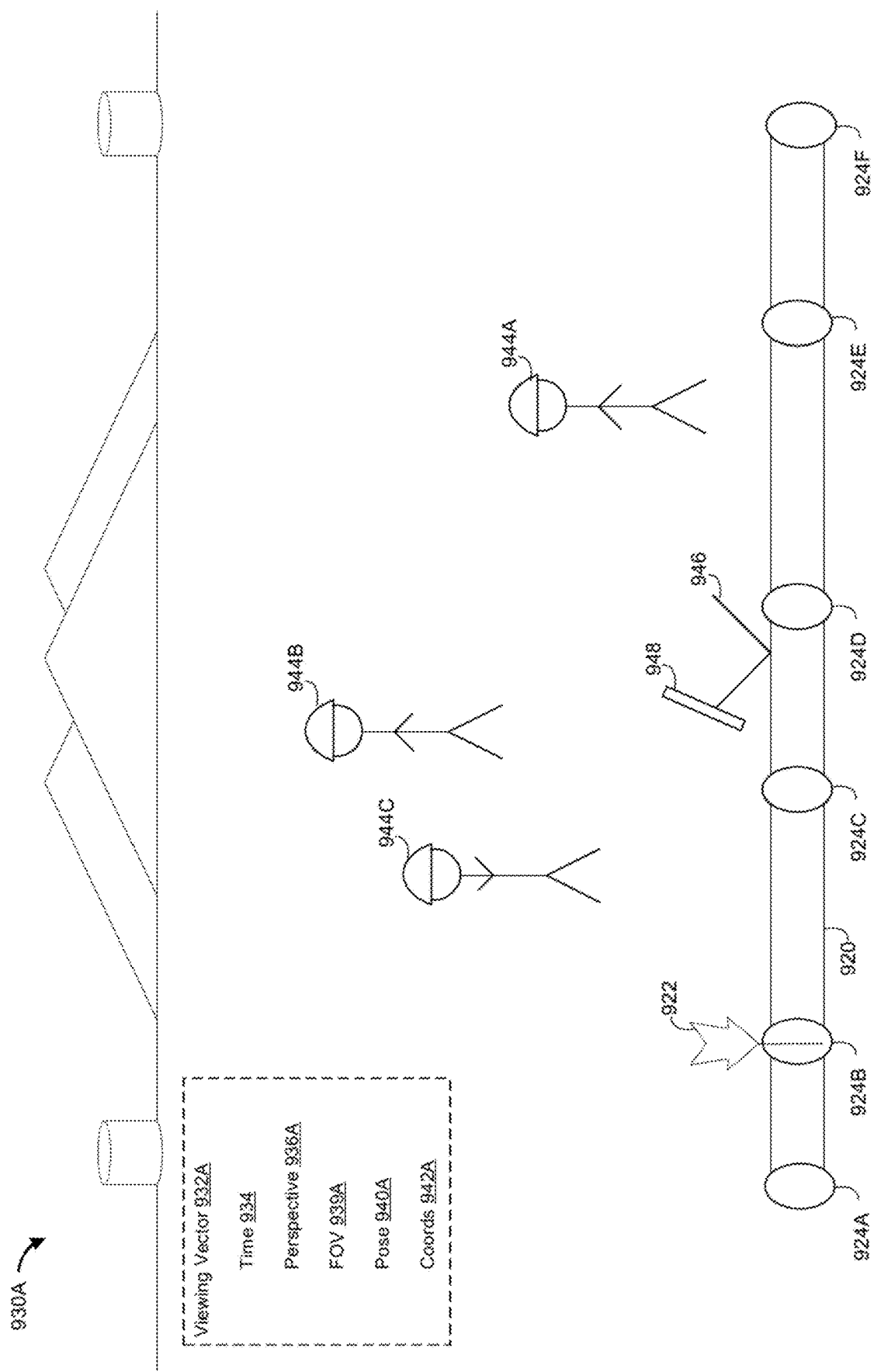

As shown in FIG. 9B, the SR setting 930A corresponds to a second SR setting (e.g., a construction setting) presented by the electronic device 103 or the HMD 104, including a plurality of workers 944A, 944B, and 944C (sometimes collectively referred to as the workers 944) and the hands of the user represented as a worker 946 holding an SR item 948 within the second SR setting. In some implementations, the hands of the user are mapped to SR hands of an SR avatar holding the SR item 948 associated with the worker 946. In some implementations, the hands of the user correspond to video pass-through or optical see-through of his/her hands holding the SR item 948 associated with the worker 946.

According to some implementations, the viewing vector 932A is characterized by a perspective 936A, an FOV 938A, a pose 940A, and a set of coordinates 942A. In FIG. 9B, the perspective 936A corresponds to worker within the second SR setting, the FOV 938A corresponds to a size, shape, focal length, right-side up or upside-down, etc. of a viewing field associated with the worker 946, the pose 910 corresponds to rotational coordinates associated with the FOV 938A (e.g., title, angle, and pitch), and the set of coordinates 942A corresponds to the location associated with the FOV 938A.

For example, the electronic device 103 or the HMD 104 detects a second input associated with modifying the pose 940A (e.g., rotational coordinates) associated with the FOV 938A at time 934 such as a voice command, a gesture input, touch input, gaze direction input, or the like from the user of the electronic device 103 or the HMD 104. For example, the second input corresponds to an interaction with a pose modification affordance (not shown in FIG. 9B).

In some implementations, the SR setting 930A includes an FOV modification affordance (or set of controls) provided to modify the FOV associated with the viewing vector 932A. In some implementations, the SR setting 930A includes a pose modification affordance (or set of controls) provided to change the pose (e.g., rotational coordinates) associated with the viewing vector 932A. In some implementations, the SR setting 930A includes a coordinates modification affordance (or set of controls) provided to change the coordinates (e.g., translational coordinates) associated with the viewing vector 932A. In some implementations, the SR setting 930A includes a perspective modification affordance (or set of controls) provided to change the perspective (e.g., from the worker 946 to the worker 944A or to a foreman's perspective associated with a center of gravity of the workers 944 and the worker 946). In some implementations, the SR setting 930A includes a previous perspective affordance provided to revert to a previous perspective (e.g., the perspective 906 in FIG. 9A) at the current time (e.g., time 934). In some implementations, the SR setting 930A includes a set of playback controls (e.g., play, pause, reverse, fast-forward, etc.).

Figure 9C:
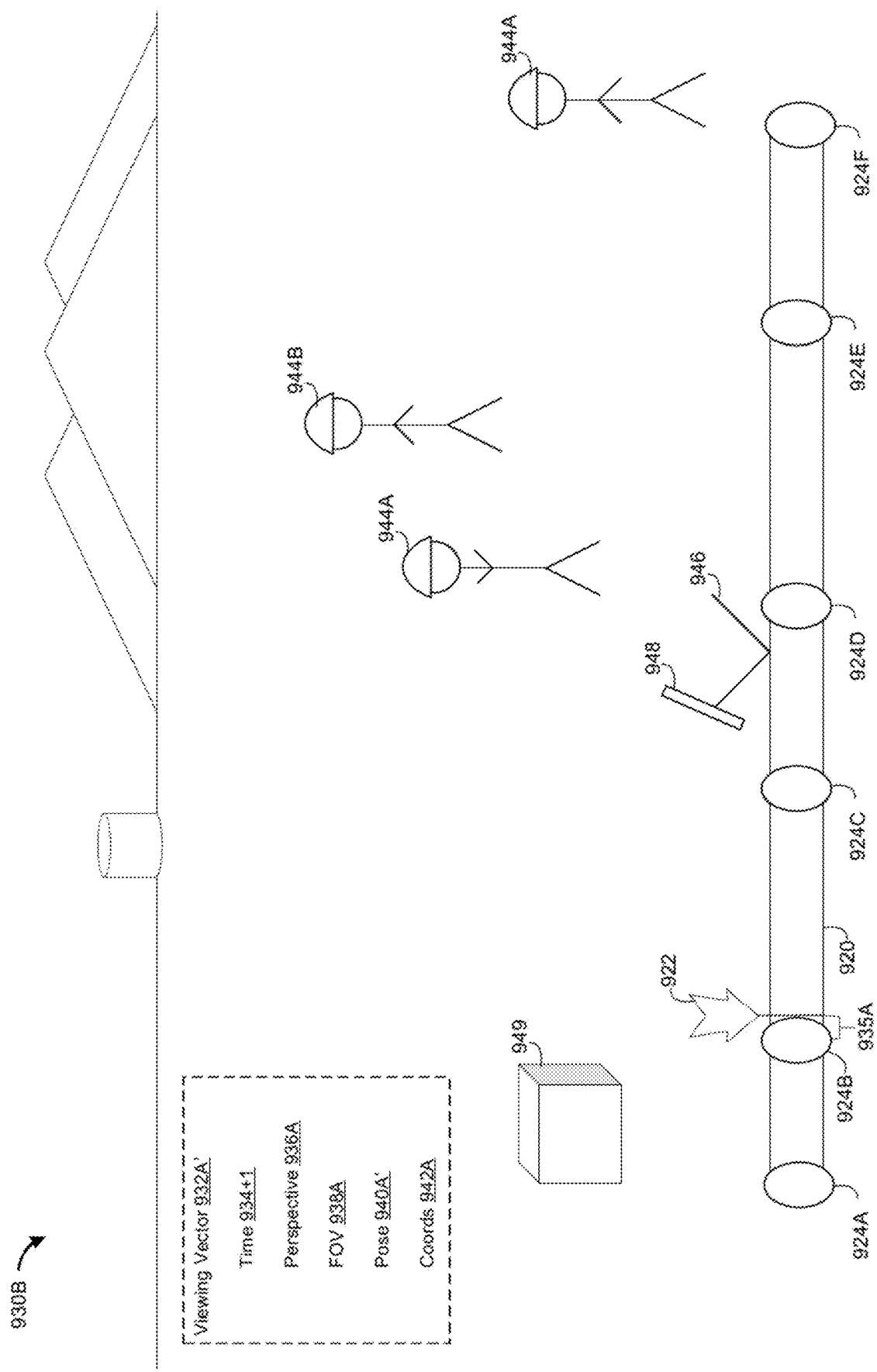

Continuing with the example above, in response to detecting the second input associated with changing the pose 940A, FIG. 9C illustrates an example SR setting 930B presented from a viewing vector 932A' at time 934+1. The time 934+1 in FIG. 9C and the time 934 in FIG. 9B are separated by a delta time period 935A (e.g., X seconds). As shown in FIG. 9C, the SR setting 930B corresponds to the second SR setting presented by the electronic device 103 or the HMD 104, including a construction item 949, the plurality of workers 944, and the hands of the user represented as the worker 946 holding the SR item 948 within the second SR setting.

According to some implementations, the viewing vector 932A' is characterized by the perspective 936A, the FOV 938A, a pose 940A' (e.g., the changed pose relative to FIG. 9B), and the set of coordinates 942A. In FIG. 9C, the viewing vector 932A' is still associated with the perspective 936A (e.g., the worker 946), the FOV 938A, and the set of coordinates 942A, but the viewing vector 932A' is associated with the changed pose 940A'. As one example, the head or body of the worker 946 has been rotated counter-clockwise.

Figure 9D:
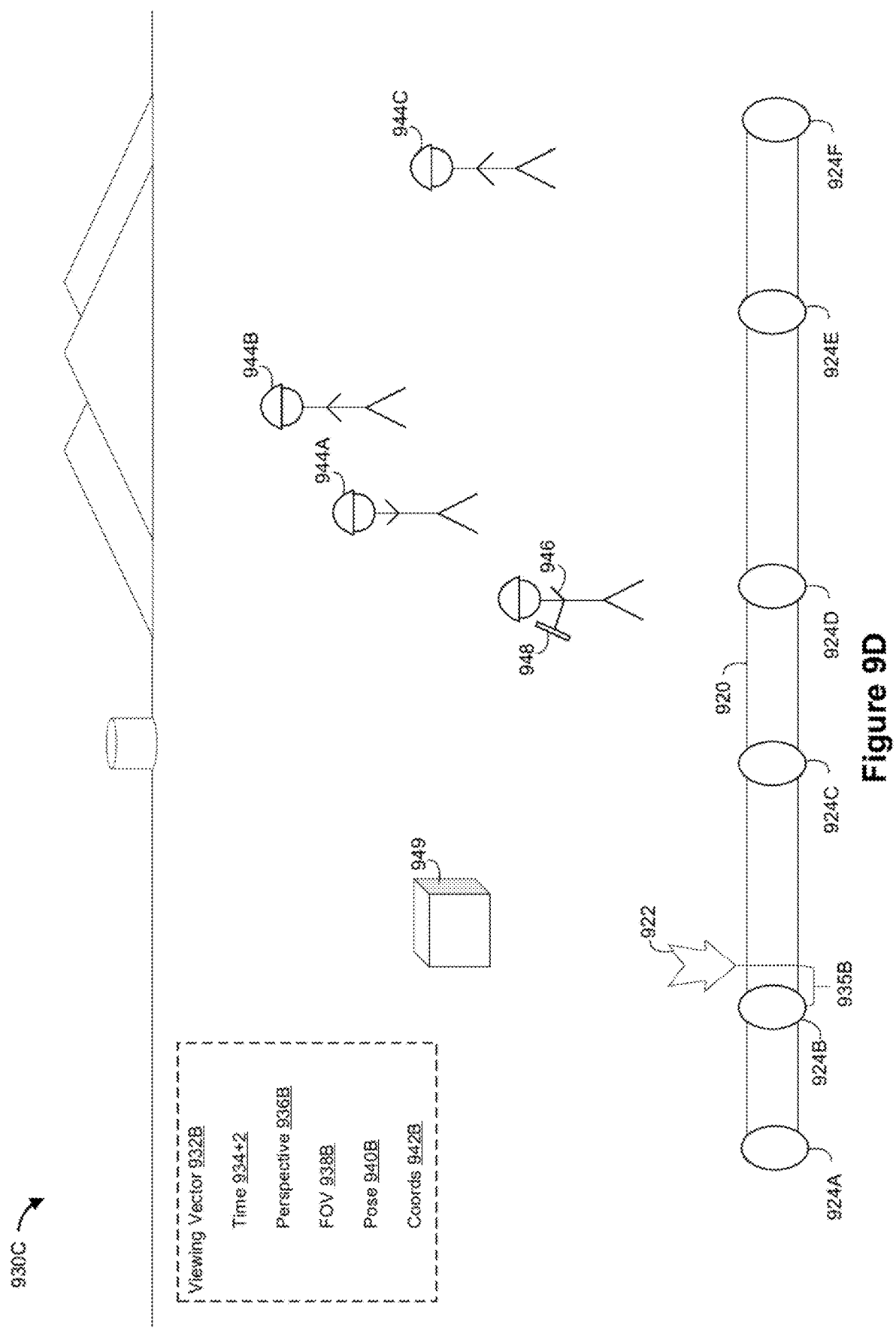

For example, the electronic device 103 or the HMD 104 detects a third input associated with changing the perspective 936A at time 934+1 such as a voice command, a gesture input, touch input, gaze direction input, or the like from the user of the electronic device 103 or the HMD 104, for example, interacting with a perspective modification affordance (not shown in FIG. 9C). Continuing with this example, in response to detecting the third input associated with changing the perspective 936A, FIG. 9D illustrates an example SR setting 930C presented from a viewing vector 932B at time 934+2. The time 934+2 in FIG. 9D and the time 934 in FIG. 9B are separated by a delta time period 935B (e.g., Y seconds), wherein the delta time period 935B is greater than the delta time period 935A. As shown in FIG. 9D, the SR setting 930C corresponds to the second SR setting presented by the electronic device 103 or the HMD 104, including a construction item 949, the plurality of workers 944, and the worker 946 holding the SR item 948 within the second SR setting.

According to some implementations, the viewing vector 932B is characterized by a perspective 936B, an FOV 938B, a pose 940B, and a set of coordinates 942B. In FIG. 9D, the viewing vector 932B is associated with perspective 936B (e.g., an omniscient view of the second SR setting) as opposed to the perspective 936A in FIGS. 9B and 9C (e.g., the view of the worker 946 within the second SR setting).

Figure 9E:
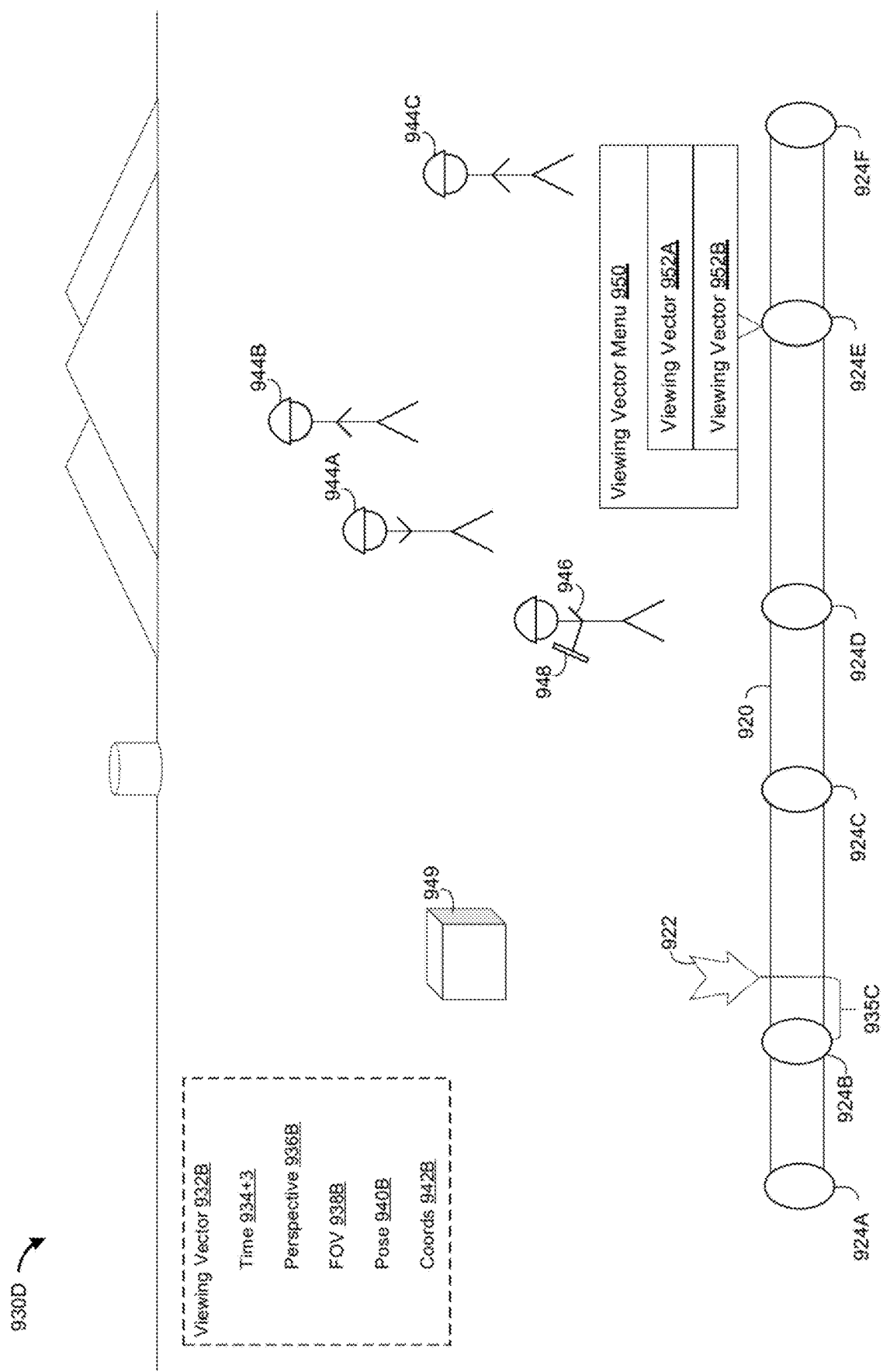

For example, the electronic device 103 or the HMD 104 detects a fourth input selecting the viewing vector affordance 924E at time 934+2 such as a voice command, gesture input, touch input, gaze direction input, or the like from the user of the electronic device 103 or the HMD 104. Continuing with this example, in response to detecting the fourth input selecting the viewing vector affordance 924E, FIG. 9E illustrates the example SR setting 930D presented from a viewing vector 932B at time 934+3, including a viewing vector menu 950 with a plurality of selectable viewing vector affordance options 952A and 952B for the time associated with the viewing vector affordance 924E. The time 934+3 in FIG. 9E and the time 934 in FIG. 9B are separated by a delta time period 935C (e.g., Z seconds), wherein the delta time period 935C is greater than delta time periods 935A and 935B. In some implementations, each of the selectable viewing vector affordance options 952A and 952B within the viewing vector menu 950 is associated with a different OE that corresponds to a story node within the conditionally dependent SR content threads 600. In some implementations, each of the selectable viewing vector affordance options 952A and 952B within the viewing vector menu 950 is associated with a different OE encapsulation that corresponds to a story node within the conditionally dependent SR content threads 600.

For example, the electronic device 103 or the HMD 104 detects a fifth input selecting the viewing vector affordance option 952A at time 934+3 such as a voice command, gesture input, touch input, gaze direction input, or the like from the user of the electronic device 103 or the HMD 104. Continuing with this example, in response to detecting the fifth input selecting the viewing vector affordance option 952A, FIG. 9F illustrates an example SR setting 970 presented from a viewing vector 972 at time 974.

Figure 9F:
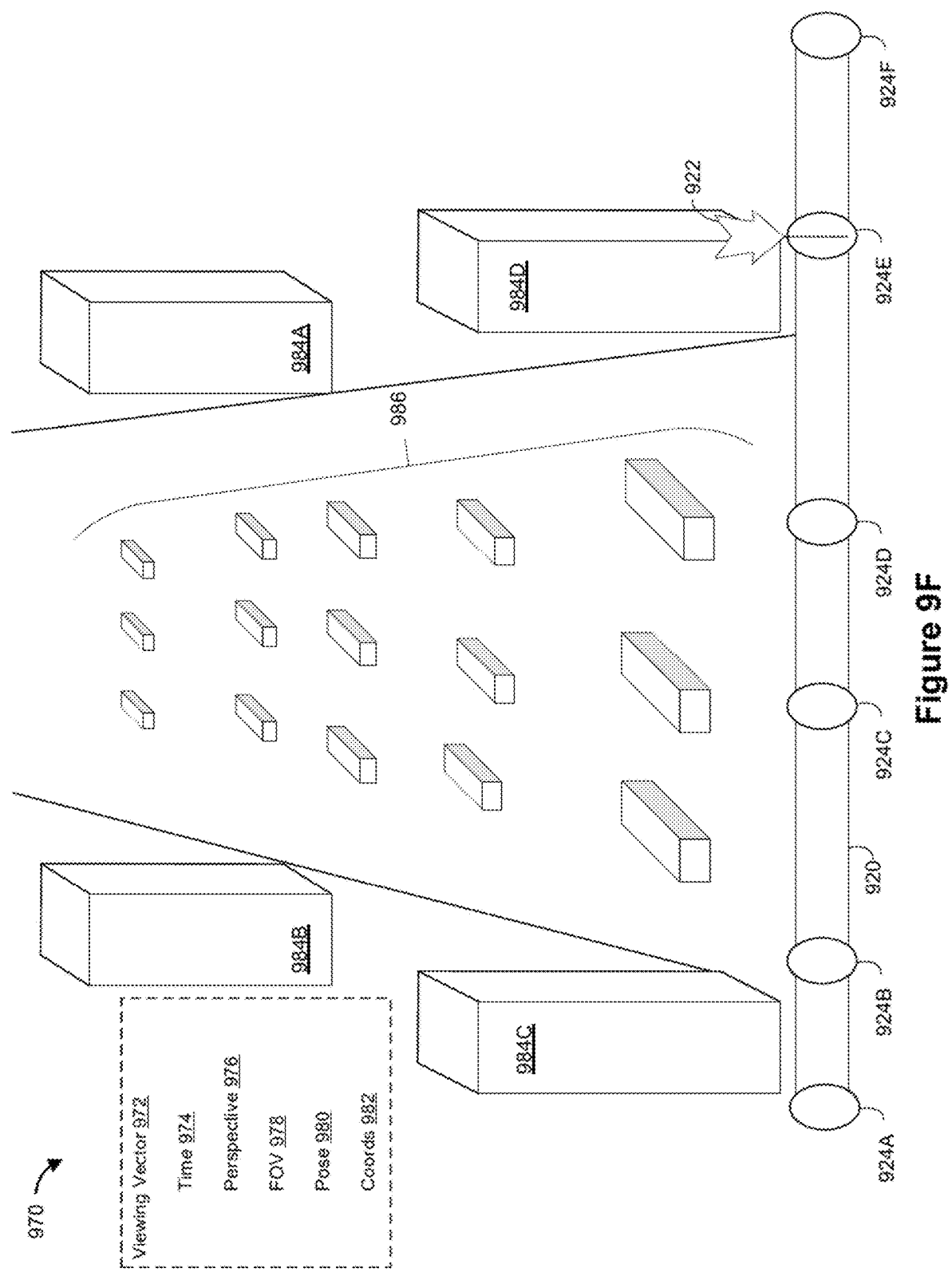

As shown in FIG. 9F, the SR setting 970 corresponds to a third SR setting (e.g., a parade or procession) presented by the electronic device 103 or the HMD 104, including a plurality of buildings 984A, 984B, 984C, and 984D (sometimes collectively referred to as the buildings 984) and a plurality of vehicles 986 within the third SR setting. According to some implementations, the viewing vector 972 is characterized by a perspective 976, an FOV 978, a pose 980, and a set of coordinates 982. In FIG. 9F, the perspective 976 corresponds to a view associated with a commander of the plurality of vehicles 986, the FOV 978 corresponds to a size, shape, focal length, right-side up or upside-down, etc. of a viewing field associated with the commander's view, the pose 980 corresponds to rotational coordinates associated with the FOV 978 (e.g., title, angle, and pitch), and the set of coordinates 982 corresponds to the location associated with the FOV 978.

Figure 10:
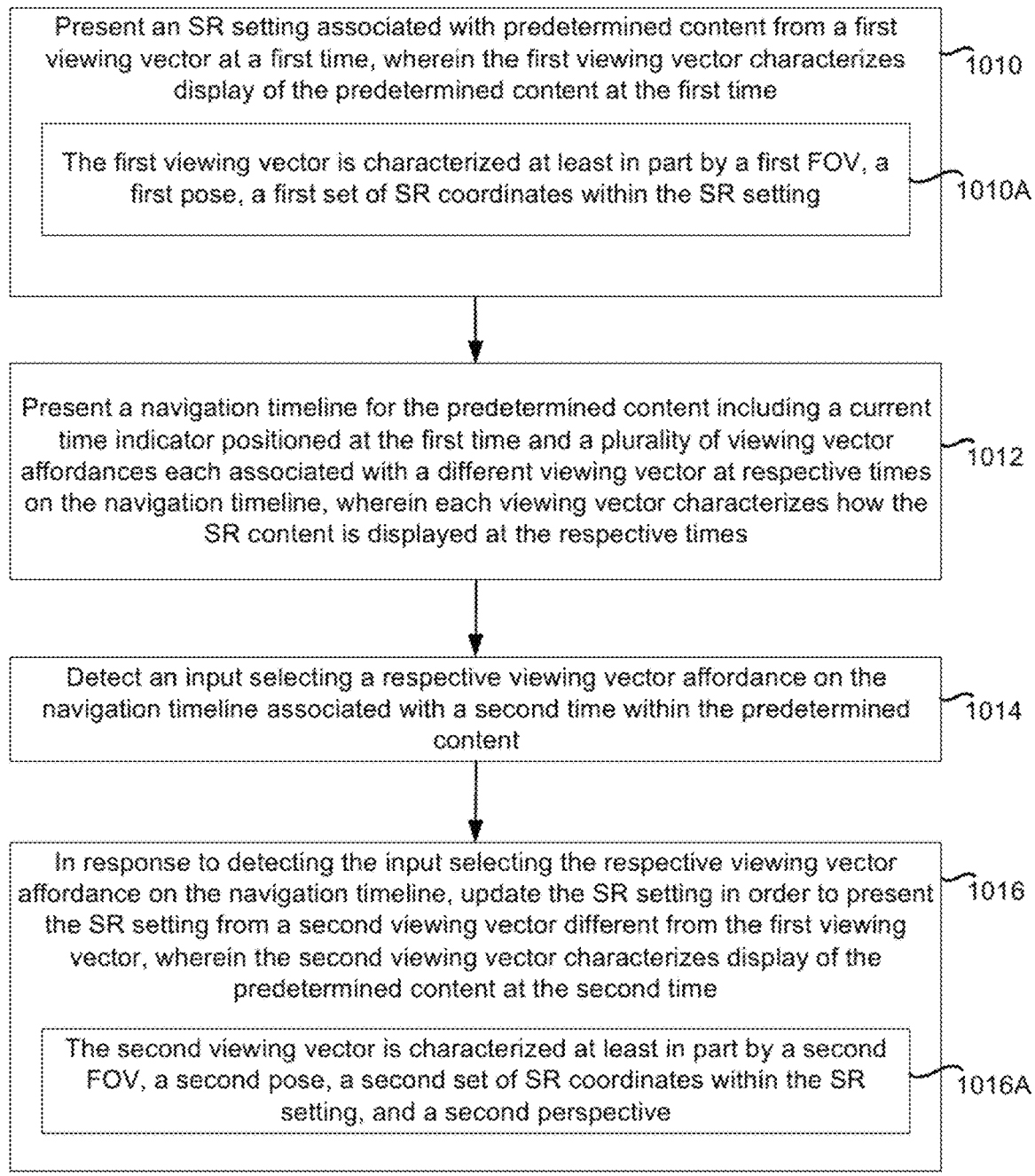
FIG. 10 is a flowchart representation of a method of changing viewing vectors within an SR setting in accordance with some implementations.

FIG. 10 is flowchart representation of a method of changing viewing vectors within an SR setting in accordance with some implementations. In various implementations, the method 1000 is performed by a device with a non-transitory memory and one or more processors coupled with the non-transitory memory (e.g., the controller 102, the electronic device 103 shown in FIG. 1A, and/or the HMD 104 shown in FIG. 1B). In some implementations, the method 1000 is performed by processing logic, including hardware, firmware, software, or a combination thereof. In some implementations, the method 1000 is performed by a processor executing code stored in a non-transitory computer-readable medium (e.g., a memory).

As represented by block 1010, the method 1000 includes presenting a synthesized reality (SR) setting associated with predetermined content from a first viewing vector at a first time, wherein the first viewing vector characterizes display of the predetermined content at the first time. For example, in FIG. 9A, the electronic device 103 or the HMD 104 presents the SR setting 900 from a viewing vector 902 at time 904, where the SR setting 900 corresponds to a first SR setting (e.g., a driving setting).

For example, the predetermined content corresponds to a screenplay, theatrical play, movie, TV show, historical event, fictional story, live event, or the like. In some implementations, the predetermined content is replaced with emergent content that is based at least in part on source assets (e.g., initial or seed content), such as a movie, TV episode, video game, historical event, or the like, as described with reference to FIGS. 8A and 8B. In some implementations, the predetermined content is replaced with the conditionally dependent SR content threads 600 described in FIG. 6A.

In some implementations, the plurality of viewing vector affordances corresponds to predetermined viewing vectors. For example, the predetermined viewing vectors correspond to times and perspectives associated with the most important events in the predetermined content based on crowd-sourced information (e.g., frequency or volume of favorites, likes, social media impressions, etc.). In another example, the predetermined viewing vectors correspond to times and perspectives associated with the most important events in the predetermined content as manually selected by a content creator, historian, director, or the like.

In some implementations, the plurality of viewing vector affordances corresponds to viewing vectors determined based on a set of filters. For example, the set of filters are determined based on a user profile associated with the user, a battery of questions answered by the user, or the like. As one example, a plurality of viewing vectors associated with machinery within the predetermined content are selected based on activation of a mechanic filter. As another example, a plurality of viewing vectors associated with naval exercises within the predetermined content are selected based on activation of a naval trainee filter. As yet another example, a plurality of viewing vectors associated with weather phenomena within the predetermined content based on activation of a meteorology filter.

In some implementations, as represented by block 1010a, the first viewing vector is characterized at least in part by a first field-of-view (FOV), a first pose, a first set of SR coordinates within the SR setting. For example, in FIG. 9A, the electronic device 103 or the HMD 104 presents the SR setting 900 from the viewing vector 902 characterized by the perspective 906, the FOV 908, the pose 910, and the set of coordinates 912.

In some implementations, the FOV corresponds to a parameter defining the shape, size, focal length, and/or the like of the viewing field. In some implementations, the pose corresponds to a set of rotational coordinates associated with the FOV (e.g., pitch, roll, and yaw). In some implementations, the pose indicates whether the angle of the FOV and whether the FOV is right-side up or upside-down. In some implementations, the set of SR coordinates corresponds to a set of translational coordinates within the SR setting (e.g., global coordinates relative to the SR setting or environment). In some implementations, the perspective corresponds to a unit, point-of-view (POV), or objective-effectuator (OE) associated with the predetermined content such as an omniscient POV, a general's POV, infantry unit POV, individual soldier's POV, or the like within a historical battle.

In some implementations, the first viewing vector is associated with a respective viewing vector affordance. In some implementations, the first viewing vector is not associated with one of the plurality of viewing vector affordances. For example, the user changed viewing perspectives several times prior to the first time. For example, in FIG. 9A, the viewing vector 902 is not associated with one of the plurality of viewing vector affordances 924.

As represented by block 1012, the method 1000 includes presenting a navigation timeline for the predetermined content including a current time indicator positioned at the first time and a plurality of viewing vector affordances each associated with a different viewing vector at respective times on the navigation timeline, wherein each viewing vector characterizes how the SR content is displayed at the respective times. In one example, the navigation timeline is overlaid on the SR setting. In another example, the navigation timeline is presented as a part of a separate controls interface. For example, in FIG. 9A, the electronic device 103 or the HMD 104 presents the SR setting 900, including a navigation timeline 920 with a current time indicator 922 and a plurality of viewing vector affordances 924. In some implementations, each of the viewing vector affordances is associated with an OE that corresponds to a story node within the conditionally dependent SR content threads 600. In some implementations, each of the viewing vector affordances is associated with an OE encapsulation that corresponds to a story node within the conditionally dependent SR content threads 600.

As represented by block 1014, the method 1000 includes detecting an input selecting a respective viewing vector affordance on the navigation timeline associated with a second time within the predetermined content. In some implementations, the input corresponds to a voice command, gesture input, touch input, gaze direction, or the like. For example, with reference to FIG. 9A, the electronic device 103 or the HMD 104 detects a first input selecting the viewing vector affordance 924B at time 904 such as a voice command, gesture input, touch input, gaze direction input, or the like from a user of the electronic device 103 or the HMD 104 via one or more input devices (e.g., microphone, gaze tracker, body pose estimator, touch-sensitive surface, buttons, etc.).

In some implementations, the input corresponds to a first input type, and, when the user input corresponds to a second input type, a menu of viewing vector options for the time is presented. In some implementations, the menu is ranked according to the most popular viewing vectors based on crowd-sourced information. In some implementations, the menu is sorted according to a predetermined order. For example, with respect to the sequence in FIGS. 9A and 9B, the first input selecting the viewing vector affordance 924B corresponds to a first input type (e.g., short press, single tap, first voice command, etc.). Thus, continuing with the example sequence in FIGS. 9A and 9B, detection of the first input associated with the first input type at time 904 causes the electronic device 103 or the HMD 104 to transition from presenting the SR setting 900 in FIG. 9A from the viewing vector 902 to the SR setting 930A from the viewing vector 932A in FIG. 9B. In contrast, with reference to the sequence in FIGS. 9D and 9E, the fourth input selecting the viewing vector affordance 924E corresponds to a second input type (e.g., long press, double tap, second voice command, etc.). Thus, continuing with the example sequence in FIGS. 9D and 9E, detection of the fourth input associated with the second input type at time 934+3 causes the electronic device 103 or the HMD 104 to present the viewing vector menu 950 with a plurality of selectable viewing vector affordance options 952A and 952B for the time associated with the viewing vector affordance 924E.

As represented by block 1016, the method 1000 includes, in response to detecting the input selecting the respective viewing vector affordance on the navigation timeline, updating the SR setting in order to present the SR setting from a second viewing vector different from the first viewing vector, wherein the second viewing vector characterizes display of the predetermined content at the second time. For example, in response to detecting the first input selecting the viewing vector affordance 924B at time 904 in FIG. 9A, FIG. 9B illustrates the electronic device 103 or the HMD 104 presenting an example SR setting 930A from a viewing vector 932A at time 934 associated with the viewing vector affordance 924B.

In some implementations, as represented by block 1016a, the second viewing vector is characterized at least in part by a second FOV, a second pose, a second set of SR coordinates within the SR setting, and a second perspective. For example, in FIG. 9B, the electronic device 103 or the HMD 104 presents the SR setting 930A from the viewing vector 932A characterized by the perspective 936A, the FOV 938A, the pose 940A, and the SR coordinates 942A.

In some implementations, in response to detecting the input selecting the respective viewing vector affordance on the navigation timeline, the device presents the current time indicator positioned at the second time. For example, in response to detecting the first input selecting the viewing vector affordance 924B at time 904 in FIG. 9A, the electronic device 103 or the HMD 104 moves the current time indicator 922 moves to a position proximate to the viewing vector affordance 924B in FIG. 9B.

In some implementations, in response to detecting the input selecting the respective viewing vector affordance on the timeline, the device ceases to display the SR setting from the first viewing vector. For example, in response to detecting the first input selecting the viewing vector affordance 924B at time 904 in FIG. 9A, the electronic device 103 or the HMD 104 ceases to display the SR setting (900 from the viewing vector 902 and instead displays the SR setting 930A from the viewing vector 932A in FIG. 9B.

In some implementations, the device further presents a field-of-view (FOV) modification affordance provided to modify a current FOV associated with the second viewing vector based on one or more subsequent user inputs. In some implementations, changing the FOV corresponds to increasing or decreasing the viewing filed (e.g., increase the viewing field from 30 degrees to 180 degrees). In some implementations, changing the FOV corresponds to changing the shape of the viewing field (e.g., changing from elliptical to rectangular). In some implementations, changing the FOV corresponds to changing the focal length of the viewing field. In some implementations, changing the FOV corresponds to changing a zoom level of the viewing field.

In some implementations, the device further presents a pose modification affordance provided to change a current pose associated with the second viewing vector to a subsequent pose based on one or more subsequent inputs. In some implementations, changing the pose corresponds to changing the roll, pitch, or yaw of the current FOV of the current perspective such as changing the head tilt or pitch of a unit or OE. For example, changing the pose corresponds to changing the FOV from a soldier's eyes to the FOV from their back. As another example, changing the pose corresponds to changing the FOV from the rear of a vehicle to the FOV from the front a vehicle. For example, with reference to the sequence in FIGS. 9B and 9C, in response to detecting the second input associated with changing the pose 940A in FIG. 9B, the electronic device 103 or the HMD 104 presents the SR setting 930B presented from a viewing vector 932A' at time 934+1 FIG. 9C. Continuing with this example sequence, the viewing vector 932A' is characterized by the perspective 936A, the FOV 938A, a pose 940A' (e.g., the changed pose relative to FIG. 9B), and the set of coordinates 942A. In FIG. 9C, the viewing vector 932A' is still associated with the perspective 936A (e.g., the worker 946), the FOV 938A, and the set of coordinates 942A, but the viewing vector 932A' is associated with the changed pose 940A'. As one example, the head or body of the worker 946 has been rotated counter-clockwise.

In some implementations, the device further presents an SR coordinates modification affordance provided to change a current set of SR coordinates associated with the second viewing vector to a subsequent set of SR coordinates within the SR setting based on one or more subsequent inputs. In some implementations, changing the set of SR coordinates corresponds to ambulating, driving, or otherwise moving the current perspective (e.g., the current unit or OE). In some implementations, changing the set of SR coordinates corresponds to changing from a first-person view of the current perspective (e.g., the current unit or OE) to a third-person view.

In some implementations, the device further presents a perspective modification affordance provided to change from a current second perspective associated with the second viewing vector to a subsequent perspective based on a menu of options. In some implementations, changing the current perspective (e.g., unit or OE) corresponds to switching from an omniscient point-of-view (POV) to a specific unit/OE's POV. For example, with reference to the sequence in FIGS. 9C and 9D, in response to detecting the third input associated with changing the perspective 936A in FIG. 9C, the electronic device 103 or the HMD 104 presents the SR setting 930C presented from a viewing vector 932B at time 934+2 in FIG. 9D. Continuing with this example sequence, the viewing vector 932B is characterized by a perspective 936B, an FOV 938B, a pose 940B, and a set of coordinates 942B. In FIG. 9D, the viewing vector 932B is associated with perspective 936B (e.g., an omniscient view of the second SR setting) as opposed to the perspective 936A in FIGS. 9B and 9C (e.g., the view of the worker 946 within the second SR setting).

In some implementations, while presenting the predetermined content from the second viewing vector, the device further presents a previous perspective affordance, for viewing the SR setting from a previous perspective associated with the first viewing vector at the second time. For example, in response to detecting an input associated with the previous perspective affordance in FIG. 9B, the electronic device 103 or the HMD 104 transitions from presenting the SR setting from a current viewing vector associated with the perspective 936A at time 934 to presenting the SR setting from a subsequent vector associated with the perspective 906 at a next time period.

In some implementations, the device detects one or more subsequent inputs associated with the time timescale. In response to detecting the one or more subsequent inputs, the device changes a time scale associated with the navigation timeline for the narrative and updating the plurality of viewing vector affordances based on the changed time scale. For example, the one or more subsequent inputs corresponds to pinch-in or pinch out gestures. As another example, the one or more subsequent inputs corresponds to voice commands associated with zooming in or out from the current timescale associated with navigation timeline.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including a non-transitory memory and one or more processors coupled with the non-transitory memory:

presenting a synthesized reality (SR) setting associated with a first portion of predetermined content from a first viewing vector, wherein the first viewing vector characterizes display of the first portion of the predetermined content from a first perspective associated with a first entity within the predetermined content;

concurrently presenting a navigation timeline for the predetermined content and a perspective modification affordance associated with the first portion of predetermined content overlaid on the SR setting, wherein the navigation timeline includes a current time indicator and a plurality of viewing vector affordances each associated with a different viewing vector at different times within the predetermined content, and wherein each viewing vector characterizes how SR content is displayed at the different times;

detecting a first input selecting the perspective modification affordance associated with the first portion of predetermined content;

in response to detecting the first input selecting the perspective modification affordance, presenting a first menu overlaid on the SR setting, wherein the first menu includes a first plurality of selectable perspectives corresponding to different entities associated with the first portion of predetermined content;

detecting a second input selecting a respective viewing vector affordance from among the plurality of viewing vector affordances on the navigation timeline associated with a second portion of the predetermined content different from the first portion of the predetermined content, wherein the first portion of the predetermined content corresponds to a first temporal portion of the predetermined content and the second portion of the predetermined content corresponds to a second temporal portion of the predetermined content different from the first temporal portion of the predetermined content;

in response to detecting the second input selecting the respective viewing vector affordance on the navigation timeline, presenting a second menu including a second plurality of selectable perspectives corresponding to presenting a second menu overlaid on the SR setting, wherein the second menu includes a second plurality of selectable perspectives corresponding to different entities associated with the second portion of the predetermined content, wherein the second plurality of selectable perspectives are different from the first plurality of selectable perspectives;

after presenting the second menu overlaid on the SR setting, detecting a third input selecting a respective selectable perspective from among the second plurality of selectable perspectives associated with a second viewing vector; and in response to detecting the third input, updating the SR setting in order to present the SR setting from the second viewing vector different from the first viewing vector, wherein the second viewing vector characterizes display of the second portion of the predetermined content at from a second perspective associated with a second entity within the predetermined content different from the first entity.

2. The method of claim 1, wherein the first viewing vector is characterized at least in part by a first field-of-view (FOV), a first pose, a first set of SR coordinates within the SR setting, and a first perspective, and wherein the second viewing vector is characterized at least in part by a second FOV, a second pose, a second set of SR coordinates within the SR setting, and a second perspective.

3. The method of claim 1, further comprising:

in response to detecting the second input selecting the respective viewing vector affordance on the navigation timeline, presenting the current time indicator positioned relative to the second portion of the predetermined content.

4. The method of claim 1, further comprising:

in response to detecting the second input selecting the respective viewing vector affordance on the navigation timeline, ceasing to display the SR setting from the first viewing vector.

5. The method of claim 1, wherein the plurality of viewing vector affordances corresponds to predetermined viewing vectors.

6. The method of claim 1, wherein the plurality of viewing vector affordances corresponds to viewing vectors determined based on a set of filters.

7. The method of claim 1, further comprising:

presenting a field-of-view (FOV) modification affordance provided to modify a current FOV associated with the second viewing vector based on one or more subsequent inputs.

8. The method of claim 1, further comprising:

presenting a pose modification affordance provided to change a current pose associated with the second viewing vector to a subsequent pose based on one or more subsequent inputs.

9. The method of claim 1, further comprising:

presenting an SR coordinates modification affordance provided to change a current set of SR coordinates associated with the second viewing vector to a subsequent set of SR coordinates within the SR setting based on one or more subsequent inputs.

10. The method of claim 1, further comprising:

while presenting the SR setting from the second viewing vector, presenting a previous perspective affordance for viewing the SR setting from a previous perspective associated with the first viewing vector.

11. The method of claim 1, wherein the predetermined content corresponds to one of a pre-existing story, movie, TV episode, book, theatrical play, or historical event.

12. The method of claim 1, wherein the predetermined content corresponds to emergent content based at least in part on one or more pre-existing source assets.

13. The method of claim 12, wherein the one or more pre-existing source assets correspond to at least one of a pre-existing story, movie, TV episode, book, theatrical play, or historical event.

14. The method of claim 1, wherein the predetermined content corresponds to conditionally dependent SR content threads.

15. The method of claim 1, wherein the first, second, and third inputs corresponds to one of a voice command, a gesture input, a touch input, or a gaze directional input.

16. The method of claim 1, further comprising:

detecting one or more subsequent inputs associated with the navigation timeline; and in response to detecting the one or more subsequent inputs, changing a timescale associated with the navigation timeline for the predetermined content and updating the plurality of viewing vector affordances based on the changed time scale.

17. The method of claim 1, wherein the device corresponds to a mobile device, and wherein the SR setting is composited with at least a portion of a physical setting and composited content is presented on a display of the mobile device.

18. The method of claim 1, wherein the predetermined content corresponds to a plurality of conditionally dependent content threads associated with a related event, and
wherein the first perspective associated with the first entity corresponds to a first content thread among plurality of conditionally dependent content threads and the second perspective associated with the second entity corresponds to a second content thread among plurality of conditionally dependent content threads different from the first content thread.

19. The method of claim 1, wherein the first and second entities correspond to different characters within the predetermined content.

20. A device comprising:
one or more processors;
a non-transitory memory; and
one or more programs stored in the non-transitory memory, which, when executed by the one or more processors, cause the device to:
  present a synthesized reality (SR) setting associated with a first portion of predetermined content from a first viewing vector, wherein the first viewing vector characterizes display of the first portion of the predetermined content at the first time from a first perspective associated with a first entity within the predetermined content;
  concurrently present a navigation timeline for the predetermined content and a perspective modification affordance associated with the first portion of predetermined content overlaid on the SR setting, wherein the navigation timeline includes a current time indicator and a plurality of viewing vector affordances each associated with a different viewing vector at different times within the predetermined content, and wherein each viewing vector characterizes how SR content is displayed at the different times;
  detect a first input selecting the perspective modification affordance associated with the first portion of predetermined content;
  in response to detecting the first input selecting the perspective modification affordance, present a first menu overlaid on the SR setting, wherein the first menu includes a first plurality of selectable perspectives corresponding to different entities associated with the first portion of predetermined content;
  detect a second input selecting a respective viewing vector affordance from among the plurality of viewing vector affordances on the navigation timeline associated with a second portion of the predetermined content different from the first portion of the predetermined content, wherein the first portion of the predetermined content corresponds to a first temporal portion of the predetermined content and the second portion of the predetermined content corresponds to a second temporal portion of the predetermined content different from the first temporal portion of the predetermined content;
  in response to detecting the second input selecting the respective viewing vector affordance on the navigation timeline, present a second menu overlaid on the SR setting, wherein the second menu includes a second plurality of selectable perspectives corresponding to different entities associated with the second portion of the predetermined content, wherein the second plurality of selectable perspectives are different from the first plurality of selectable perspectives;
  after presenting the second menu overlaid on the SR setting, detect a third input selecting a respective selectable perspective from among the second plurality of selectable perspectives associated with a second viewing vector; and
  in response to detecting the third input, update the SR setting in order to present the SR setting from a second viewing vector different from the first viewing vector, wherein the second viewing vector characterizes display of the second portion of the predetermined content at from a second perspective associated with a second entity within the predetermined content different from the first entity.

21. The device of claim 20, wherein the predetermined content corresponds to a plurality of conditionally dependent content threads associated with a related event, and
wherein the first perspective associated with the first entity corresponds to a first content thread among plurality of conditionally dependent content threads and the second perspective associated with the second entity corresponds to a second content thread among plurality of conditionally dependent content threads different from the first content thread.

22. The device of claim 20, wherein the first and second entities correspond to different characters within the predetermined content.

23. A non-transitory memory storing one or more programs, which, when executed by one or more processors of a device, cause the device to:
present a synthesized reality (SR) setting associated with a first portion of predetermined content from a first viewing vector, wherein the first viewing vector characterizes display of the first portion of the predetermined content from a first perspective associated with a first entity within the predetermined content;
concurrently present a navigation timeline for the predetermined content and a perspective modification affordance associated with the first portion of predetermined content overlaid on the SR setting, wherein the navigation timeline includes a current time indicator and a plurality of viewing vector affordances each associated with a different viewing vector at different times within the predetermined content, and wherein each viewing vector characterizes how SR content is displayed at the different times;
detect a first input selecting the perspective modification affordance associated with the first portion of predetermined content;
in response to detecting the first input selecting the perspective modification affordance, present a first menu overlaid on the SR setting, wherein the first menu includes a first plurality of selectable perspectives corresponding to different entities associated with the first portion of predetermined content;

detect a second input selecting a respective viewing vector affordance from among the plurality of viewing vector affordances on the navigation timeline associated with a second portion of the predetermined content different from the first portion of the predetermined content, wherein the first portion of the predetermined content corresponds to a first temporal portion of the predetermined content and the second portion of the predetermined content corresponds to a second temporal portion of the predetermined content different from the first temporal portion of the predetermined content;

in response to detecting the second input selecting the respective viewing vector affordance on the navigation timeline, present a second menu overlaid on the SR setting, wherein the second menu includes a second plurality of selectable perspectives corresponding to different entities associated with the second portion of the predetermined content, wherein the second plurality of selectable perspectives are different from the first plurality of selectable perspectives;

after presenting the second menu overlaid on the SR setting, detect a third input selecting a respective selectable perspective from among the second plurality of selectable perspectives associated with a second viewing vector; and in response to detecting the third input, update the SR setting in order to present the SR setting from the second viewing vector different from the first viewing vector, wherein the second viewing vector characterizes display of the second portion of the predetermined content at from a second perspective associated with a second entity within the predetermined content different from the first entity.

24. The non-transitory memory of claim 22, wherein the predetermined content corresponds to a plurality of conditionally dependent content threads associated with a related event, and wherein the first perspective associated with the first entity corresponds to a first content thread among plurality of conditionally dependent content threads and the second perspective associated with the second entity corresponds to a second content thread among plurality of conditionally dependent content threads different from the first content thread.

25. The non-transitory memory of claim 23, wherein the first and second entities correspond to different characters within the predetermined content.

* * * * *